US012713162B2

(12) United States Patent
Deng et al.

(10) Patent No.: US 12,713,162 B2
(45) Date of Patent: Aug. 18, 2026

(54) IMAGE SENSOR AND CONTROL METHOD THEREOF

(71) Applicant: HUAWEI TECHNOLOGIES CO., LTD., Shenzhen (CN)

(72) Inventors: Zhipeng Deng, Shanghai (CN); Yang Li, Shenzhen (CN); Hui Hu, Shenzhen (CN); Xiaojin Zhao, Shenzhen (CN); Haibiao Zuo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/041,751

(22) Filed: Jan. 30, 2025

(65) Prior Publication Data

US 2025/0184640 A1 Jun. 5, 2025

Related U.S. Application Data

(63) Continuation of application No. PCT/CN2023/109062, filed on Jul. 25, 2023.

(30) Foreign Application Priority Data

Jul. 30, 2022 (CN) ......................... 202210912459.3

(51) Int. Cl.
*H04N 25/78* (2023.01)
*H04N 25/616* (2023.01)

(52) U.S. Cl.
CPC ........... *H04N 25/78* (2023.01); *H04N 25/616* (2023.01)

(58) Field of Classification Search
CPC ............................ H04N 25/78; H04N 25/616
See application file for complete search history.

(56) References Cited

U.S. PATENT DOCUMENTS

| | | | |
|---|---|---|---|
| 9,402,037 | B2 | 7/2016 | Ichikawa |
| 11,089,253 | B2 | 8/2021 | Shim et al. |

(Continued)

FOREIGN PATENT DOCUMENTS

| | | | |
|---|---|---|---|
| CN | 106686327 | A | 5/2017 |
| CN | 108471621 | A | 8/2018 |
| CN | 110505417 | A | 11/2019 |

OTHER PUBLICATIONS

Liu et al., "A 4.6μm, 512×512, Ultra-Low Power Stacked Digital Pixel Sensor with Triple Quantization and 127dB Dynamic Range," IEEE International Electron Devices Meeting (IEDM), total 4 pages (Dec. 12-18, 2020).

*Primary Examiner* — Lin Ye
*Assistant Examiner* — Fayez A Bhuiyan
(74) *Attorney, Agent, or Firm* — Leydig, Voit & Mayer, Ltd.

(57) ABSTRACT

An image sensor and a control method are provided. The image sensor includes an optical-to-electrical conversion unit, a signal readout unit, and a conversion gain determining unit, the optical-to-electrical conversion unit includes a photodiode, and the signal readout unit includes a floating diffusion node, a dual conversion gain transistor, and a first capacitor. The floating diffusion node is configured to store a charge corresponding to an electrical signal obtained by converting incident light by the photodiode. The conversion gain determining unit is configured to compare a magnitude of a cathode voltage of the photodiode with a magnitude of a reference voltage, and output a control voltage based on a comparison result, wherein the control voltage is used to control the dual conversion gain transistor to be turned on or off.

20 Claims, 12 Drawing Sheets

(56) References Cited

U.S. PATENT DOCUMENTS

2007/0222879 A1 9/2007 Glenn et al.
2017/0026591 A1 1/2017 Yuki
2022/0272289 A1* 8/2022 Oh ........................ H04N 25/78

* cited by examiner

IMAGE SENSOR AND CONTROL METHOD THEREOF

CROSS-REFERENCE TO RELATED APPLICATIONS

This application is a continuation of International Application No. PCT/CN2023/109062, filed on Jul. 25, 2023, which claims priority to Chinese Patent Application No. 202210912459.3, filed on Jul. 30, 2022. The disclosures of the aforementioned applications are hereby incorporated by reference in their entireties.

TECHNICAL FIELD

Embodiments of this application relate to the field of image processing technologies, and in particular, to an image sensor and a control method thereof.

BACKGROUND

For an image sensor with single exposure, a capacitance at a floating diffusion potential of a pixel unit in the image sensor needs to be changed, so that different voltage changes are generated at the floating diffusion potential under a same quantity of electrons (namely, a quantity of electrons generated in a photodiode), in other words, a conversion gain (that is, a voltage variation at a floating diffusion potential caused by each electron) changes, to obtain an image with a high dynamic range.

For the foregoing single-exposure solution, two conversion gain modes are usually used, to obtain the image with the high dynamic range. Specifically, in a low-illumination environment, a high conversion gain mode (HCG) is used, and in this case, the capacitance at the floating diffusion potential is small. In a high-illumination environment, a low conversion gain mode (LCG) is used, and in this case, the capacitance at the floating diffusion potential is large.

Currently, an image with a high dynamic range is mainly obtained by an image sensor shown in FIG. 1 in two conversion gain modes. As shown in FIG. 1, the image sensor includes a photodiode PD, a reset transistor RST, a charge transmission gate TG, a source follower SF, a row selector RS, and a dual conversion gain transistor DCG, where a source of the RST, a gate of the SF, a source of the TG, and a drain of the DCG are connected to a floating diffusion potential FD. After the PD starts exposure, the DCG in the image sensor is turned off. In this case, a capacitance $C_{FD}$ at the floating diffusion potential FD (namely, a parasitic capacitance at the FD) is equal to $C_{par}$; and the image sensor enters an HCG mode, and outputs a frame of image through subsequent circuit (for example, an image signal processing circuit) processing. Then, the DCG is turned on. In this case, $C_{FD}$-$C_{par}$+$C_s$; and the image sensor enters an LCG mode, and outputs another frame of image through subsequent circuit processing. Finally, after image signal processing, the two frames of images are combined into one image for output, and the image is used as an image with a high dynamic range.

However, in the foregoing solution, regardless of intensity of incident light during each exposure, the image sensor first enters the HCG mode and then enters the LCG mode. Output voltages of pixels in the two modes both need to be quantized by an analog-to-digital converter (ADC) in the image sensor. Therefore, for one frame of image with a high dynamic range, the ADC needs to operate twice. Consequently, calculation costs and power consumption of the image sensor are increased, and a frame rate is reduced.

SUMMARY

Embodiments of this application provide an image sensor and a control method thereof, to reduce operation costs and power consumption of the image sensor, increase a frame rate, and achieve high applicability.

According to a first aspect, this application provides an image sensor. The image sensor includes an optical-to-electrical conversion unit, a signal readout unit, and a conversion gain determining unit, the optical-to-electrical conversion unit includes a photodiode, and the signal readout unit includes a floating diffusion node, a dual conversion gain transistor, and a first capacitor. The floating diffusion node is configured to store a charge corresponding to an electrical signal obtained by converting incident light by the photodiode. The dual conversion gain transistor is configured to connect the floating diffusion node to the first capacitor or disconnect the floating diffusion node from the first capacitor. The conversion gain determining unit is configured to compare a magnitude of a cathode voltage of the photodiode with a magnitude of a reference voltage, and output a control voltage based on a comparison result, where the control voltage is used to control the dual conversion gain transistor to be turned on or off. Therefore, the first capacitor is connected to or not connected to the floating diffusion node, so that the image sensor can automatically select a conversion gain mode (namely, an HCG mode or an LCG mode) based on intensity of the incident light received by the photodiode, to ensure that the image sensor needs to collect a reset voltage and a signal voltage only once and an ADC needs to operate only once, thereby reducing operation costs and power consumption of the image sensor, increasing a frame rate, and achieving high applicability.

With reference to the first aspect, in a first possible implementation, both a cathode of the photodiode and a first end of the dual conversion gain transistor are connected to the floating diffusion node, a second end of the dual conversion gain transistor is connected to one end of the first capacitor, and both an anode of the photodiode and the other end of the first capacitor are connected to a reference ground. An input end and an output end of the conversion gain determining unit are connected to the cathode of the photodiode and a control end of the dual conversion gain transistor respectively.

With reference to the first possible implementation of the first aspect, in a second possible implementation, the conversion gain determining unit includes a comparator and a latch, an input end of the comparator is connected to the cathode of the photodiode, and an output end of the comparator is connected to the control end of the dual conversion gain transistor through the latch. The comparator compares the magnitude of the cathode voltage of the photodiode with the magnitude of the reference voltage, and outputs the control voltage to the latch based on the comparison result. The latch outputs the control voltage based on the control voltage output by the comparator, so that an output voltage of the conversion gain determining unit is kept at the control voltage. It may be understood that the image sensor may further ensure, via the latch, that the control voltage does not fluctuate with a change of external light after the conversion gain mode is selected, so that the control voltage can be stably output. This improves stability of the image sensor, and achieves high applicability.

With reference to the second possible implementation of the first aspect, in a third possible implementation, the image sensor further includes a first switch and a controller, and an output end of the latch is connected to a signal line through the first switch. After the latch outputs the control voltage, the controller controls the first switch to be turned on, and after the image sensor outputs the control voltage through the signal line, the controller controls the first switch to be turned off, where the control voltage represents a capacitance at the floating diffusion node. It may be understood that the image sensor may output, to an image processor, the control voltage representing the capacitance at the floating diffusion node, to transfer, to the image processor, subsequently collected voltages (namely, a reset voltage and a signal voltage) that are collected in a conversion gain mode corresponding to the capacitance at the floating diffusion node. This facilitates subsequent image processing, and improves accuracy of a final image.

With reference to the second possible implementation or the third possible implementation of the first aspect, in a fourth possible implementation, the optical-to-electrical conversion unit further includes a first charge transmission gate, and the cathode of the photodiode is connected to the input end of the comparator through the first charge transmission gate. After the photodiode is exposed for first preset duration, the controller further controls the first charge transmission gate to be turned on; and after a signal voltage is obtained, the controller further controls the first charge transmission gate to be turned off. The comparator further includes an enable end, the enable end is configured to receive a first control signal output by the controller, and the first control signal is used to control an operating status of the comparator. The latch includes an enable end, the enable end is configured to receive a second control signal output by the controller, and the second control signal is used to control an operating status of the latch. After the first charge transmission gate is turned on for second preset duration, the controller further outputs the first control signal and the second control signal to the enable end of the comparator and the enable end of the latch respectively, so that both the comparator and the latch start to operate. After the comparator operates for third preset duration, the controller stops outputting the first control signal to the enable end of the comparator, so that the comparator stops operating; and after the signal voltage is obtained, the controller stops outputting the second control signal to the enable end of the latch, so that the latch stops operating. It may be understood that the latch stops operating only after the signal voltage is obtained. This can ensure that the image sensor is not affected by the change of the external light in a voltage collection process, can further improve accuracy of the collected voltages (namely, the reset voltage and the signal voltage), and can achieve high applicability.

With reference to the fourth possible implementation of the first aspect, in a fifth possible implementation, the optical-to-electrical conversion unit further includes a second charge transmission gate, and the cathode of the photodiode is connected to the floating diffusion node through the second charge transmission gate. After the comparator stops operating, in other words, after the image sensor selects a conversion gain mode corresponding to intensity of the incident light, the controller further controls the second charge transmission gate to be turned on for fourth preset duration and then turned off; and after the second charge transmission gate is turned off, the controller obtains a voltage of the floating diffusion node to obtain the signal voltage. It may be understood that, because the image sensor has selected, before the second charge transmission gate is turned on, the conversion gain mode corresponding to the intensity of the incident light, it can be ensured that the floating diffusion node has well capacity corresponding to the incident light to store all photogenerated electrons exported from the photodiode. Therefore, when the signal voltage is collected, the second charge transmission gate needs to be turned on only once, to avoid a non-linear problem caused by the second charge transmission gate being turned on for the second time, thereby improving stability of the image sensor.

With reference to the fifth possible implementation of the first aspect, in a sixth possible implementation, the cathode of the photodiode and a first end of the second charge transmission gate are connected to the input end of the comparator through the first charge transmission gate, or the cathode of the photodiode is connected to a first end of the second charge transmission gate and the input end of the comparator through the first charge transmission gate. It may be understood that the first charge transmission gate may be located between the cathode of the photodiode and the first end of the second charge transmission gate, or may be located between the first end of the second charge transmission gate and a left side of the photodiode. Therefore, the optical-to-electrical conversion unit has various structures and high flexibility.

With reference to the fifth possible implementation or the sixth possible implementation of the first aspect, in a seventh possible implementation, the signal readout unit further includes a reset transistor, and a first end and a second end of the reset transistor are connected to a power supply and the floating diffusion node respectively. After the comparator stops operating, the controller further controls the reset transistor to be turned on for fifth preset duration and then turned off; after the reset transistor is turned off, the controller obtains the voltage of the floating diffusion node to obtain a reset voltage; and after the reset voltage is obtained, the controller controls the second charge transmission gate to be turned on. After the second charge transmission gate is turned on for the fourth preset duration, the controller controls the second charge transmission gate to be turned off. After the second charge transmission gate is turned off, the controller obtains the voltage of the floating diffusion node to obtain the signal voltage. It may be understood that, after the reset voltage and the signal voltage are collected, the image sensor may further perform differential processing on the reset voltage and the signal voltage. A differential result can effectively reduce KTC noise caused when the reset transistor is turned on. This improves accuracy of the image sensor, and further improves image quality. The signal voltage is collected after the second charge transmission gate is turned off, to avoid a case in which the signal voltage keeps decreasing and is unstable with the intensity of the received light when the second charge transmission gate is turned on. This improves accuracy of the collected signal voltage, and further improves the accuracy of the image sensor.

With reference to the seventh possible implementation of the first aspect, in an eighth possible implementation, the signal readout unit further includes a first source follower and a row selector, the image sensor further includes a correlated double sampling circuit, a first end, a second end, and a control end of the first source follower are connected to the power supply, a first end of the row selector, and the floating diffusion node respectively, and a second end of the row selector is connected to the correlated double sampling circuit. After the reset transistor is turned off, the controller controls the row selector to be turned on, and controls the correlated double sampling circuit to obtain a voltage at the second end of the row selector to obtain the reset voltage. After the reset voltage is obtained, the controller controls the second charge transmission gate to be turned on. After the second charge transmission gate is turned on for the fourth preset duration, the controller controls the second charge transmission gate to be turned off. After the second charge transmission gate is turned off, the controller controls the correlated double sampling circuit to obtain the voltage at the second end of the row selector to obtain the signal voltage. After the signal voltage is obtained, the controller controls the row selector to be turned off. It may be understood that the image sensor in this implementation supports a rolling shutter mode. In addition, after the reset voltage and the signal voltage are collected, the image sensor may further perform differential processing on the reset voltage and the signal voltage through the correlated double sampling circuit. A differential result can effectively reduce KTC noise caused when the reset transistor is turned on. This improves accuracy of the image sensor, and further improves image quality. The signal voltage is collected after the second charge transmission gate is turned off, to avoid a case in which the signal voltage keeps decreasing and is unstable with the intensity of the received light when the second charge transmission gate is turned on. This improves accuracy of the collected signal voltage, and further improves the accuracy of the image sensor.

With reference to the fifth possible implementation or the sixth possible implementation of the first aspect, in a ninth possible implementation, the signal readout unit further includes a reset transistor, and a first end and a second end of the reset transistor are connected to a power supply and the floating diffusion node respectively. After the comparator stops operating, the controller further controls the reset transistor to be turned on for fifth preset duration and then turned off. After the reset transistor is turned off, the controller controls the second charge transmission gate to be turned on. After the second charge transmission gate is turned on for the fourth preset duration, the controller controls the second charge transmission gate to be turned off. After the second charge transmission gate is turned off, the controller obtains the voltage of the floating diffusion node to obtain the reset voltage. After the reset voltage is obtained, the controller obtains the voltage of the floating diffusion node to obtain the signal voltage.

With reference to the ninth possible implementation of the first aspect, in a tenth possible implementation, the signal readout unit further includes a first source follower, a second switch, a third switch, a fourth switch, a second capacitor, a third capacitor, a second source follower, and a row selector. The image sensor further includes a correlated double sampling circuit. A first end, a second end, and a control end of the first source follower are connected to the power supply, a first end of the second switch, and the floating diffusion node respectively, a second end of the second switch is connected to a control end of the second source follower, a first end and a second end of the second source follower are connected to the power supply and a first end of the row selector respectively, and a second end of the row selector is connected to the correlated double sampling circuit. The third switch is connected in series to the second capacitor and then connected between the second end of the second switch and the reference ground, and the fourth switch is connected in series to the third capacitor and then connected between the second end of the second switch and the reference ground. After the comparator stops operating, the controller further controls the reset transistor, the second switch, and the third switch to be turned on. After the reset transistor is turned on for the fifth preset duration, the reset transistor is controlled to be turned off. After the third switch is turned on for sixth preset duration, that is, after the sixth preset duration starting from a moment of turning on the reset transistor, the controller controls the third switch to be turned off, where the sixth preset duration is greater than the fifth preset duration. After the third switch is turned off, the controller controls the second charge transmission gate and the fourth switch to be turned on. After the second charge transmission gate is turned on for the fourth preset duration, the controller controls the second charge transmission gate to be turned off. After the fourth switch is turned on for seventh preset duration, that is, after the seventh preset duration starting from a moment of turning on the second charge transmission gate, the controller controls the fourth switch and the second switch to be turned off, where the seventh preset duration is greater than the fourth preset duration. After the fourth switch is turned off, the controller controls the row selector and the third switch to be turned on, and controls the correlated double sampling circuit to obtain a voltage at the second end of the row selector to obtain the reset voltage. After the reset voltage is obtained, the controller controls the third switch to be turned off. After the third switch is turned off, the controller controls the fourth switch to be turned on, and controls the correlated double sampling circuit to obtain the voltage at the second end of the row selector to obtain the signal voltage. After the signal voltage is obtained, the controller controls the row selector and the fourth switch to be turned off. It may be understood that the image sensor in this implementation supports a global shutter mode. In addition, after the reset voltage and the signal voltage are collected, the image sensor may further perform differential processing on the reset voltage and the signal voltage through the correlated double sampling circuit. A differential result can effectively reduce KTC noise caused when the reset transistor is turned on. This improves accuracy of the image sensor, and further improves image quality. The signal voltage is collected after the second charge transmission gate is turned off, to avoid a case in which the signal voltage keeps decreasing and is unstable with the intensity of the received light when the second charge transmission gate is turned on. This improves accuracy of the collected signal voltage, and further improves the accuracy of the image sensor.

With reference to any one of the seventh possible implementation to the tenth possible implementation of the first aspect, in an eleventh possible implementation, before the photodiode is exposed, the controller further controls the reset transistor and the second charge transmission gate to be turned on for eighth preset duration and then turned off. Therefore, it is ensured that the voltage of the floating diffusion node and the cathode voltage of the photodiode are reset before the reset voltage and the signal voltage are collected. This improves accuracy of the collected reset voltage and signal voltage.

With reference to the eighth possible implementation or the tenth possible implementation of the first aspect, in a twelfth possible implementation, the floating diffusion node is a connection point between a second end of the second charge transmission gate, the second end of the reset transistor, and the control end of the first source follower.

With reference to the first possible implementation to the twelfth possible implementation of the first aspect, in a thirteenth possible implementation, the image sensor includes at least two optical-to-electrical conversion units.

The floating diffusion node is configured to store a charge corresponding to an electrical signal obtained through conversion of at least two photodiodes in the at least two optical-to-electrical conversion units. The input end of the conversion gain determining unit is connected to cathodes of the at least two photodiodes, the output end of the conversion gain determining unit is connected to the control end of the dual conversion gain transistor, and the conversion gain determining unit is specifically configured to compare the magnitude of the reference voltage with a magnitude of a voltage obtained by connecting the at least two photodiodes in parallel. It may be understood that the image sensor is also applicable to a multi-pixel binning mode, supports application of an adaptive conversion gain determining mechanism (that is, a manner of automatically determining, based on the intensity of the incident light, the conversion gain mode corresponding to the intensity of the incident light) in a small-sized pixel, and has higher applicability.

According to a second aspect, this application provides an image sensor control method. An image sensor includes an optical-to-electrical conversion unit, a signal readout unit, and a conversion gain determining unit, the optical-to-electrical conversion unit includes a photodiode, and the signal readout unit includes a floating diffusion node, a dual conversion gain transistor, and a first capacitor, where the floating diffusion node is configured to store a charge corresponding to an electrical signal obtained by converting incident light by the photodiode, and the dual conversion gain transistor is configured to connect the floating diffusion node to the first capacitor or disconnect the floating diffusion node from the first capacitor. The method includes: The conversion gain determining unit compares a magnitude of a cathode voltage of the photodiode with a magnitude of a reference voltage, and outputs a control voltage based on a comparison result, where the control voltage is used to control the dual conversion gain transistor to be turned on or off.

With reference to the second aspect, in a first possible implementation, both a cathode of the photodiode and a first end of the dual conversion gain transistor are connected to the FD node, a second end of the dual conversion gain transistor is connected to one end of the first capacitor, both an anode of the photodiode and the other end of the first capacitor are connected to a reference ground, and an input end and an output end of the conversion gain determining unit are connected to the cathode of the photodiode and a control end of the dual conversion gain transistor respectively.

With reference to the first possible implementation of the second aspect, in a second possible implementation, the conversion gain determining unit includes a comparator and a latch, an input end of the comparator is connected to the cathode of the photodiode, and an output end of the comparator is connected to the control end of the dual conversion gain transistor through the latch. The conversion gain determining unit compares the magnitude of the cathode voltage of the photodiode with the magnitude of the reference voltage via the comparator, and outputs the control voltage to the latch based on the comparison result. The conversion gain determining unit outputs the control voltage via the latch, so that an output voltage of the conversion gain determining unit is kept at the control voltage.

With reference to the second possible implementation of the second aspect, in a third possible implementation, the image sensor further includes a first switch and a controller, and an output end of the latch is connected to a signal line through the first switch. After the latch outputs the control voltage, the controller controls the first switch to be turned on, and after the image sensor outputs the control voltage through the signal line, the controller controls the first switch to be turned off, where the control voltage represents a capacitance at the floating diffusion node.

With reference to the second possible implementation or the third possible implementation of the second aspect, in a fourth possible implementation, the optical-to-electrical conversion unit further includes a first charge transmission gate, and the cathode of the photodiode is connected to the input end of the comparator through the first charge transmission gate. After the photodiode is exposed for first preset duration, the controller controls the first charge transmission gate to be turned on; and after a signal voltage is obtained, the controller controls the first charge transmission gate to be turned off.

The comparator further includes an enable end, the enable end is configured to receive a first control signal output by the controller, the first control signal is used to control an operating status of the comparator, the latch includes an enable end, the enable end is configured to receive a second control signal output by the controller, and the second control signal is used to control an operating status of the latch. After the first charge transmission gate is turned on for second preset duration, the controller outputs the first control signal and the second control signal to the enable end of the comparator and the enable end of the latch respectively, so that both the comparator and the latch start to operate. After the comparator operates for third preset duration, the controller stops outputting the first control signal to the enable end of the comparator, so that the comparator stops operating; and after the signal voltage is obtained, the controller stops outputting the second control signal to the enable end of the latch, so that the latch stops operating.

With reference to the fourth possible implementation of the second aspect, in a fifth possible implementation, the optical-to-electrical conversion unit further includes a second charge transmission gate, and the cathode of the photodiode is connected to the floating diffusion node through the second charge transmission gate. After the comparator stops operating, the controller controls the second charge transmission gate to be turned on for fourth preset duration and then turned off; and after the second charge transmission gate is turned off, the controller obtains a voltage of the floating diffusion node to obtain the signal voltage.

With reference to the fifth possible implementation of the second aspect, in a sixth possible implementation, the cathode of the photodiode and a first end of the second charge transmission gate are connected to the input end of the comparator through the first charge transmission gate, or the cathode of the photodiode is connected to a first end of the second charge transmission gate and the input end of the comparator through the first charge transmission gate.

With reference to the fifth possible implementation or the sixth possible implementation of the second aspect, in a seventh possible implementation, the signal readout unit further includes a reset transistor, and a first end and a second end of the reset transistor are connected to a power supply and the floating diffusion node respectively. After the comparator stops operating, the controller controls the reset transistor to be turned on for fifth preset duration and then turned off. After the reset transistor is turned off, the controller obtains the voltage of the floating diffusion node to obtain a reset voltage. After the reset voltage is obtained, the controller controls the second charge transmission gate to be turned on. After the second charge transmission gate is turned on for the fourth preset duration, the controller controls the second charge transmission gate to be turned off; and after the second charge transmission gate is turned off, the controller obtains the voltage of the floating diffusion node to obtain the signal voltage.

With reference to the seventh possible implementation of the second aspect, in an eighth possible implementation, the signal readout unit further includes a first source follower and a row selector, the image sensor further includes a correlated double sampling circuit, a first end, a second end, and a control end of the first source follower are connected to the power supply, a first end of the row selector, and the floating diffusion node respectively, and a second end of the row selector is connected to the correlated double sampling circuit. After the reset transistor is turned off, the controller controls the row selector to be turned on, and controls the correlated double sampling circuit to obtain a voltage at the second end of the row selector to obtain the reset voltage. After the reset voltage is obtained, the controller controls the second charge transmission gate to be turned on; and after the second charge transmission gate is turned on for the fourth preset duration, the controller controls the second charge transmission gate to be turned off. After the second charge transmission gate is turned off, the controller controls the correlated double sampling circuit to obtain the voltage at the second end of the row selector to obtain the signal voltage. After the signal voltage is obtained, the controller controls the row selector to be turned off.

With reference to the fifth possible implementation or the sixth possible implementation of the second aspect, in a ninth possible implementation, the signal readout unit further includes a reset transistor, and a first end and a second end of the reset transistor are connected to a power supply and the floating diffusion node respectively. After the comparator stops operating, the controller controls the reset transistor to be turned on for the fifth preset duration and then turned off; and after the reset transistor is turned off, the controller controls the second charge transmission gate to be turned on. After the second charge transmission gate is turned on for the fourth preset duration, the controller controls the second charge transmission gate to be turned off. After the second charge transmission gate is turned off, the controller obtains the voltage of the floating diffusion node to obtain the reset voltage. After the reset voltage is obtained, the controller obtains the voltage of the floating diffusion node to obtain the signal voltage.

With reference to the ninth possible implementation of the second aspect, in a tenth possible implementation, the signal readout unit further includes a first source follower, a second switch, a third switch, a fourth switch, a second capacitor, a third capacitor, a second source follower, and a row selector. The image sensor further includes a correlated double sampling circuit. A first end, a second end, and a control end of the first source follower are connected to the power supply, a first end of the second switch, and the floating diffusion node respectively, a second end of the second switch is connected to a control end of the second source follower, a first end and a second end of the second source follower are connected to the power supply and a first end of the row selector respectively, and a second end of the row selector is connected to the correlated double sampling circuit. The third switch is connected in series to the second capacitor and then connected between the second end of the second switch and the reference ground, and the fourth switch is connected in series to the third capacitor and then connected between the second end of the second switch and the reference ground.

After the comparator stops operating, the controller further controls the reset transistor, the second switch, and the third switch to be turned on. After the reset transistor is turned on for the fifth preset duration, the reset transistor is controlled to be turned off. After the third switch is turned on for sixth preset duration, that is, after the sixth preset duration starting from a moment of turning on the reset transistor, the controller controls the third switch to be turned off, where the sixth preset duration is greater than the fifth preset duration. After the third switch is turned off, the controller controls the second charge transmission gate and the fourth switch to be turned on. After the second charge transmission gate is turned on for the fourth preset duration, the controller controls the second charge transmission gate to be turned off. After the fourth switch is turned on for seventh preset duration, that is, after the seventh preset duration starting from a moment of turning on the second charge transmission gate, the controller controls the fourth switch and the second switch to be turned off, where the seventh preset duration is greater than the fourth preset duration. After the fourth switch is turned off, the controller controls the row selector and the third switch to be turned on, and controls the correlated double sampling circuit to obtain a voltage at the second end of the row selector to obtain the reset voltage. After the reset voltage is obtained, the controller controls the third switch to be turned off. After the third switch is turned off, the controller controls the fourth switch to be turned on, and controls the correlated double sampling circuit to obtain the voltage at the second end of the row selector to obtain the signal voltage. After the signal voltage is obtained, the controller controls the row selector and the fourth switch to be turned off.

With reference to any one of the seventh possible implementation to the tenth possible implementation of the second aspect, in an eleventh possible implementation, before the photodiode is exposed, the controller further controls the reset transistor and the second charge transmission gate to be turned on for eighth preset duration and then turned off.

With reference to any one of the first possible implementation to the eleventh possible implementation of the second aspect, in a twelfth possible implementation, the image sensor includes at least two optical-to-electrical conversion units. The floating diffusion node is configured to store a charge corresponding to an electrical signal obtained through conversion of at least two photodiodes in the at least two optical-to-electrical conversion units. The input end of the conversion gain determining unit is connected to cathodes of the at least two photodiodes, and the output end of the conversion gain determining unit is connected to the control end of the dual conversion gain transistor. The conversion gain determining unit compares the magnitude of the reference voltage with a magnitude of a voltage obtained by connecting the at least two photodiodes in parallel.

According to a third aspect, this application provides an image sensor. The image sensor includes an optical-to-electrical conversion unit, a signal readout unit, a conversion gain determining unit, and a controller, the optical-to-electrical conversion unit includes a photodiode, a first charge transmission gate, and a second charge transmission gate, the signal readout unit includes a floating diffusion node, a dual conversion gain transistor, and a first capacitor, and the conversion gain determining unit includes a comparator and a latch. The floating diffusion node is configured to store a charge corresponding to an electrical signal obtained by converting incident light by the photodiode. The first charge transmission gate is configured to connect a cathode of the photodiode to an input end of the comparator or disconnect the cathode of the photodiode from the input end of the comparator, and the second charge transmission gate is configured to connect the cathode of the photodiode to the floating diffusion node or disconnect the cathode of the photodiode from the floating diffusion node. The dual conversion gain transistor is configured to connect the floating diffusion node to the first capacitor or disconnect the floating diffusion node from the first capacitor. The comparator is configured to compare a magnitude of a cathode voltage of the photodiode with a magnitude of a reference voltage, and output a control voltage based on a comparison result, where the control voltage is used to control the dual conversion gain transistor to be turned on or off. The latch is configured to output the control voltage, so that an output voltage of the conversion gain determining unit is kept at the control voltage. The comparator further includes an enable end, the enable end is configured to receive a first control signal output by the controller, the first control signal is used to control an operating status of the comparator, the latch includes an enable end, the enable end is configured to receive a second control signal output by the controller, and the second control signal is used to control an operating status of the latch.

The controller is configured to: after the first charge transmission gate is turned on for second preset duration, output the first control signal and the second control signal to the enable end of the comparator and the enable end of the latch respectively, so that both the comparator and the latch start to operate; after the comparator operates for third preset duration, stop outputting the first control signal to the enable end of the comparator, so that the comparator stops operating; after the comparator stops operating, control the second charge transmission gate to be turned on for fourth preset duration and then turned off; and after the second charge transmission gate is turned off, obtain a voltage of the floating diffusion node to obtain a signal voltage.

It may be understood that, because the image sensor has selected, before the second charge transmission gate is turned on, a conversion gain mode corresponding to intensity of the incident light, it can be ensured that the floating diffusion node has well capacity corresponding to the incident light to store all photogenerated electrons exported from the photodiode. Therefore, when the signal voltage is collected, the second charge transmission gate needs to be turned on only once, to avoid a non-linear problem caused by the second charge transmission gate being turned on for the second time, thereby improving stability of the image sensor.

With reference to the third aspect, in a first possible implementation, the controller is further configured to: after the signal voltage is obtained, stop outputting the second control signal to the enable end of the latch, so that the latch stops operating. It may be understood that the latch stops operating only after the signal voltage is obtained. This can ensure that the image sensor is not affected by a change of external light in a voltage collection process, can further improve accuracy of collected voltages (namely, a reset voltage and a signal voltage), and can achieve high applicability.

With reference to the third aspect or the first possible implementation of the third aspect, in a second possible implementation, the controller is further configured to: after the photodiode is exposed for the first preset duration, control the first charge transmission gate to be turned on; and after the signal voltage is obtained, control the first charge transmission gate to be turned off.

With reference to any one of the third aspect to the second possible implementation of the third aspect, in a third possible implementation, the cathode of the photodiode is connected to the floating diffusion node through the second charge transmission gate, the floating diffusion node is connected to a first end of the dual conversion gain transistor, a second end of the dual conversion gain transistor is connected to one end of the first capacitor, both an anode of the photodiode and the other end of the first capacitor are connected to a reference ground, the cathode of the photodiode is connected to the input end of the comparator through the first charge transmission gate, and an output end of the comparator is connected to a control end of the dual conversion gain transistor through the latch.

With reference to the third possible implementation of the third aspect, in a fourth possible implementation, the cathode of the photodiode and the first end of the second charge transmission gate are connected to the input end of the comparator through the first charge transmission gate, or the cathode of the photodiode is connected to the first end of the second charge transmission gate and the input end of the comparator through the first charge transmission gate. It may be understood that the first charge transmission gate may be located between the cathode of the photodiode and the first end of the second charge transmission gate, or may be located between the first end of the second charge transmission gate and a left side of the photodiode. Therefore, the optical-to-electrical conversion unit has various structures and high flexibility.

With reference to any one of the third aspect to the fourth possible implementation of the third aspect, in a fifth possible implementation, the image sensor further includes a first switch, and an output end of the latch is connected to a signal line through the first switch. The controller is further configured to: after the latch outputs the control voltage, control the first switch to be turned on; and after the image sensor outputs the control voltage through the signal line, control the first switch to be turned off, where the control voltage represents a capacitance at the floating diffusion node. It may be understood that the image sensor may output, to an image processor, the control voltage representing the capacitance at the floating diffusion node, to transfer, to the image processor, subsequently collected voltages (namely, a reset voltage and a signal voltage) that are collected in a conversion gain mode corresponding to the capacitance at the floating diffusion node. This facilitates subsequent image processing, and improves accuracy of a final image.

With reference to any one of the third aspect to the fifth possible implementation of the third aspect, in a sixth possible implementation, the signal readout unit further includes a reset transistor, and a first end and a second end of the reset transistor are connected to a power supply and the floating diffusion node respectively. The controller is further configured to: after the comparator stops operating, control the reset transistor to be turned on for fifth preset duration and then turned off; after the reset transistor is turned off, obtain the voltage of the floating diffusion node to obtain a reset voltage; and after the reset voltage is obtained, control the second charge transmission gate to be turned on. It may be understood that the image sensor can automatically select a conversion gain mode (namely, an HCG mode or an LCG mode) based on intensity of the incident light received by the photodiode, and sequentially collect the reset voltage and the signal voltage after the conversion gain mode is selected, to ensure that the image sensor needs to collect the reset voltage and the signal voltage only once and an ADC needs to operate only once, thereby reducing operation costs and power consumption of the image sensor, increasing a frame rate, and achieving high applicability.

With reference to the sixth possible implementation of the third aspect, in a seventh possible implementation, the signal readout unit further includes a first source follower and a row selector, the image sensor further includes a correlated double sampling circuit, a first end, a second end, and a control end of the first source follower are connected to a power supply, a first end of the row selector, and the floating diffusion node respectively, and a second end of the row selector is connected to the correlated double sampling circuit. The controller is configured to: after the reset transistor is turned off, control the row selector to be turned on, and control the correlated double sampling circuit to obtain a voltage at the second end of the row selector to obtain the reset voltage. The controller is configured to: after the second charge transmission gate is turned off, control the correlated double sampling circuit to obtain the voltage at the second end of the row selector to obtain the signal voltage. The controller is further configured to: after the signal voltage is obtained, control the row selector to be turned off.

It may be understood that the image sensor in this implementation supports a rolling shutter mode. In addition, after the reset voltage and the signal voltage are collected, the image sensor may further perform differential processing on the reset voltage and the signal voltage through the correlated double sampling circuit. A differential result can effectively reduce KTC noise caused when the reset transistor is turned on. This improves accuracy of the image sensor, and further improves image quality. The signal voltage is collected after the second charge transmission gate is turned off, to avoid a case in which the signal voltage keeps decreasing and is unstable with the intensity of the received light when the second charge transmission gate is turned on. This improves accuracy of the collected signal voltage, and further improves the accuracy of the image sensor.

With reference to the third aspect to the fifth possible implementation of the third aspect, in an eighth possible implementation, the signal readout unit further includes a reset transistor, and a first end and a second end of the reset transistor are connected to a power supply and the floating diffusion node respectively. The controller is further configured to: after the comparator stops operating, control the reset transistor to be turned on for fifth preset duration and then turned off; and after the reset transistor is turned off, control the second charge transmission gate to be turned on. The controller is further configured to: after the second charge transmission gate is turned off and before the signal voltage is obtained, obtain the voltage of the floating diffusion node to obtain a reset voltage.

With reference to the eighth possible implementation of the third aspect, in a ninth possible implementation, the signal readout unit further includes a first source follower, a second switch, a third switch, a fourth switch, a second capacitor, a third capacitor, a second source follower, and a row selector, the image sensor further includes a correlated double sampling circuit, a first end, a second end, and a control end of the first source follower are connected to the power supply, a first end of the second switch, and the floating diffusion node respectively, a second end of the second switch is connected to a control end of the second source follower, a first end and a second end of the second source follower are connected to the power supply and a first end of the row selector respectively, a second end of the row selector is connected to the correlated double sampling circuit, the third switch is connected in series to the second capacitor and then connected between the second end of the second switch and the reference ground, and the fourth switch is connected in series to the third capacitor and then connected between the second end of the second switch and the reference ground.

The controller is further configured to: after the comparator stops operating, control the second switch and the third switch to be turned on; and after the third switch is turned on for sixth preset duration, control the third switch to be turned off, where the sixth preset duration is greater than the fifth preset duration. The controller is configured to: after the third switch is turned off, control the second charge transmission gate to be turned on.

The controller is further configured to: after the third switch is turned off, control the fourth switch to be turned on; and after the fourth switch is turned on for seventh preset duration, control the fourth switch and the second switch to be turned off, where the seventh preset duration is greater than the fourth preset duration.

The controller is configured to: after the fourth switch is turned off, control the row selector and the third switch to be turned on, and control the correlated double sampling circuit to obtain a voltage at the second end of the row selector to obtain the reset voltage; after the reset voltage is obtained, control the third switch to be turned off; and after the third switch is turned off, control the fourth switch to be turned on, and control the correlated double sampling circuit to obtain the voltage at the second end of the row selector to obtain the signal voltage. The controller is further configured to: after the signal voltage is obtained, control the row selector and the fourth switch to be turned off.

It may be understood that the image sensor in this implementation supports a global shutter mode. In addition, after the reset voltage and the signal voltage are collected, the image sensor may further perform differential processing on the reset voltage and the signal voltage through the correlated double sampling circuit. A differential result can effectively reduce KTC noise caused when the reset transistor is turned on. This improves accuracy of the image sensor, and further improves image quality. The signal voltage is collected after the second charge transmission gate is turned off, to avoid a case in which the signal voltage keeps decreasing and is unstable with the intensity of the received light when the second charge transmission gate is turned on. This improves accuracy of the collected signal voltage, and further improves the accuracy of the image sensor.

With reference to any one of the second possible implementation to the ninth possible implementation of the third aspect, in a tenth possible implementation, the controller is further configured to: before the photodiode is exposed, control the reset transistor and the second charge transmission gate to be turned on for eighth preset duration and then turned off. Therefore, it is ensured that the voltage of the floating diffusion node and the cathode voltage of the photodiode are reset before the reset voltage and the signal voltage are collected. This improves accuracy of the collected reset voltage and signal voltage.

With reference to any one of the third aspect to the tenth possible implementation of the third aspect, in an eleventh possible implementation, the image sensor includes at least two optical-to-electrical conversion units. The floating diffusion node is configured to store a charge corresponding to an electrical signal obtained through conversion of at least two photodiodes in the at least two optical-to-electrical conversion units. The conversion gain determining unit is specifically configured to compare the magnitude of the reference voltage with a magnitude of a voltage obtained by connecting the at least two photodiodes in parallel. It may be understood that the image sensor is also applicable to a multi-pixel binning mode, supports application of an adaptive conversion gain determining mechanism (that is, a manner of automatically determining, based on the intensity of the incident light, the conversion gain mode corresponding to the intensity of the incident light) in a small-sized pixel, and has higher applicability.

It should be understood that mutual reference may be made to the implementations and beneficial effect of the foregoing aspects of this application.

DESCRIPTION OF EMBODIMENTS

An image sensor provided in this application is applicable to an electronic device, such as a smartphone, a tablet computer, a notebook computer, a camera, or a video camera, having a photographing function. The following describes the image sensor by using an example in which the electronic device is a camera.

Figure 1:
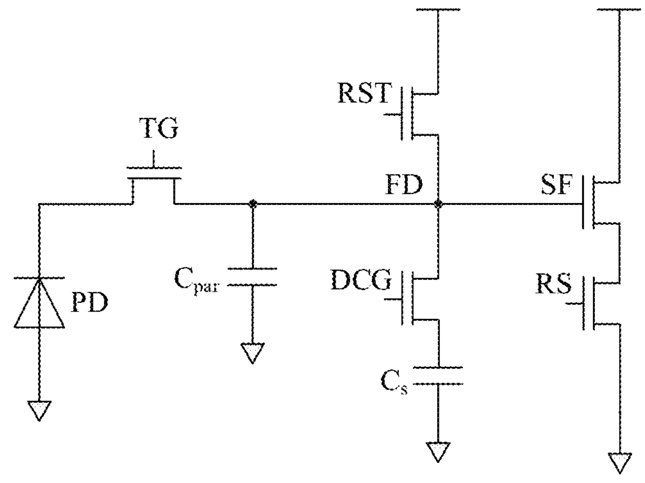
FIG. 1 is a diagram of a structure of an image sensor according to the conventional technology.
Figure 2:
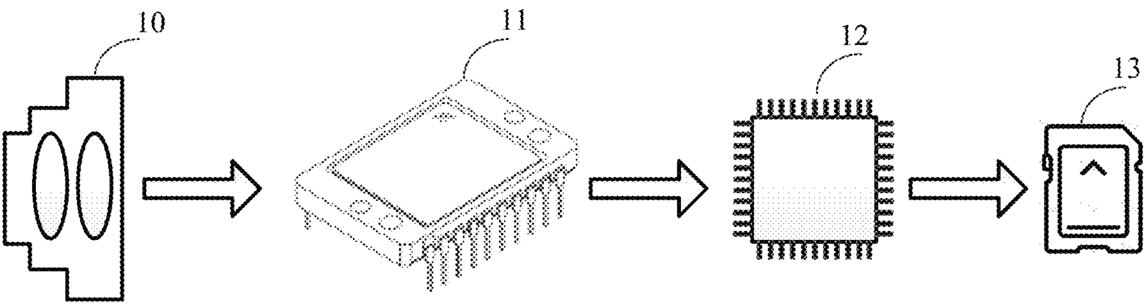
FIG. 2 is a diagram of an application scenario of an image sensor according to this application.

FIG. 2 is a diagram of an application scenario of an image sensor according to this application. As shown in FIG. 2, a camera includes a lens 10, an image sensor 11, an image signal processing circuit 12, and a memory card 13. The image sensor provided in this application may be the image sensor 11 in FIG. 1. After the camera starts exposure, light irradiated from the outside or light reflected by an object is irradiated to the image sensor 11 through the lens 10. The image sensor 11 obtains an electrical signal based on the irradiated light, and outputs the electrical signal to the image signal processing circuit 12. The image signal processing circuit 12 generates an image based on the electrical signal, and stores the generated image in the memory card 13. Herein, the image sensor 11 may select, based on intensity of the obtained light, a conversion gain mode corresponding to the obtained light, and obtain the electrical signal in the selected conversion gain mode, to ensure that an ADC needs to operate only once, thereby effectively reducing operation costs and power consumption of the image sensor, increasing a frame rate, and achieving high applicability. The foregoing description is merely an example of the application scenario for the image sensor provided in this application, but is not exhaustive. The application scenario is not limited in this application.

The following describes an example of a working principle of the image sensor provided in this application with reference to FIG. 3 to FIG. 12.

First, it should be noted that a "connection" described in this application may be a direct connection or an indirect connection. For example, that A is connected to B may be that A is directly connected to B, or that A is indirectly connected to B through one or more other electrical components, for example, A is directly connected to C, and C is directly connected to B, so that A is connected to B through C.

Figure 3:
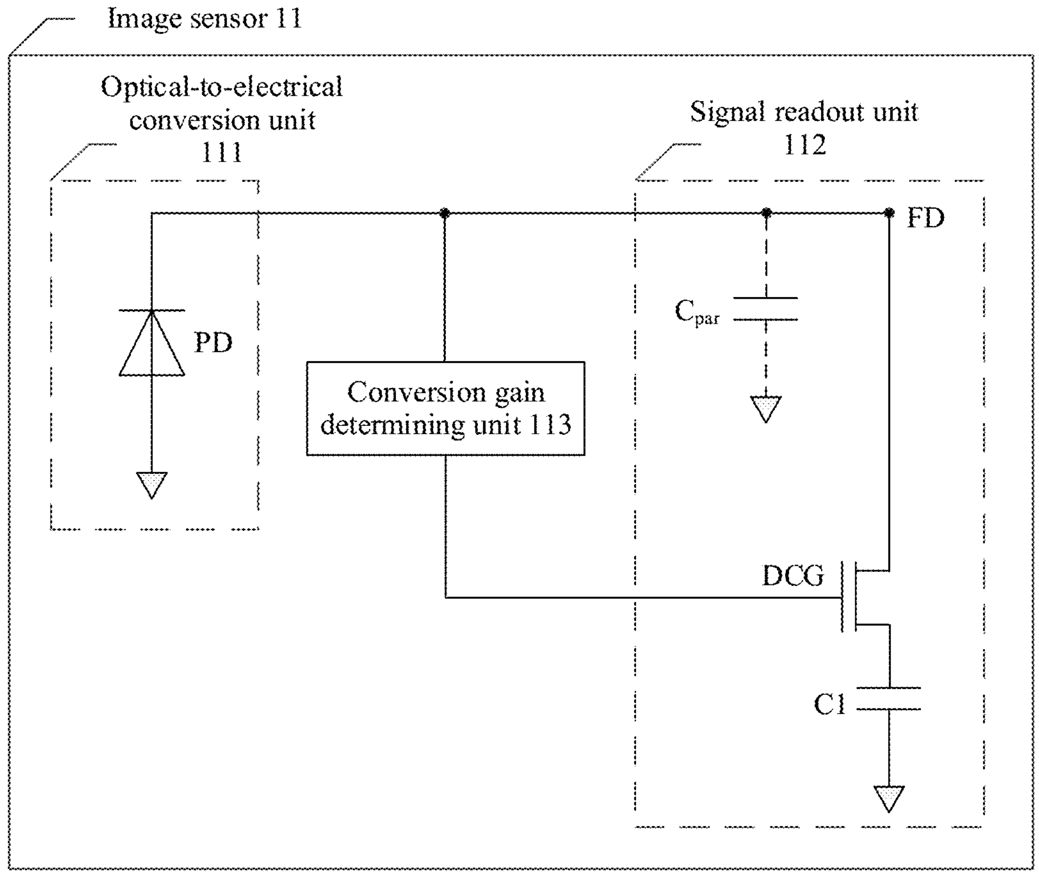
FIG. 3 is a diagram of a structure of an image sensor according to this application.

FIG. 3 is a diagram of a structure of an image sensor according to this application. As shown in FIG. 3, an image sensor 11 includes an optical-to-electrical conversion unit 111, a signal readout unit 112, and a conversion gain determining unit 113. The optical-to-electrical conversion unit 111 includes a reverse biased photodiode PD, and the signal readout unit 112 includes a floating diffusion (FD) node, a dual conversion gain transistor DCG, and a first capacitor C1. The FD node is configured to store a charge corresponding to an electrical signal obtained by converting incident light by the photodiode. A parasitic capacitance of the FD node is $C_{par}$ shown in FIG. 3. The dual conversion gain transistor DCG is configured to connect the FD node to the first capacitor C1 or disconnect the FD node from the first capacitor C1.

In an optional embodiment, after the photodiode PD is exposed, the conversion gain determining unit 113 compares a magnitude of a cathode voltage of the photodiode PD with a magnitude of a reference voltage, and outputs a control voltage based on a comparison result, and the control voltage is used to control the dual conversion gain transistor DCG to be turned on or off, to connect the FD node to the first capacitor C1 or disconnect the FD node from the first capacitor C1, that is, a capacitance at the FD node is changed, so that the image sensor 11 can automatically select a conversion gain mode (namely, an HCG mode or an LCG mode) based on intensity of the incident light, to ensure that the image sensor 11 needs to collect a reset voltage and a signal voltage only once and an ADC needs to operate only once, thereby reducing operation costs and power consumption of the image sensor 11, increasing a frame rate, and achieving high applicability.

Figure 4:
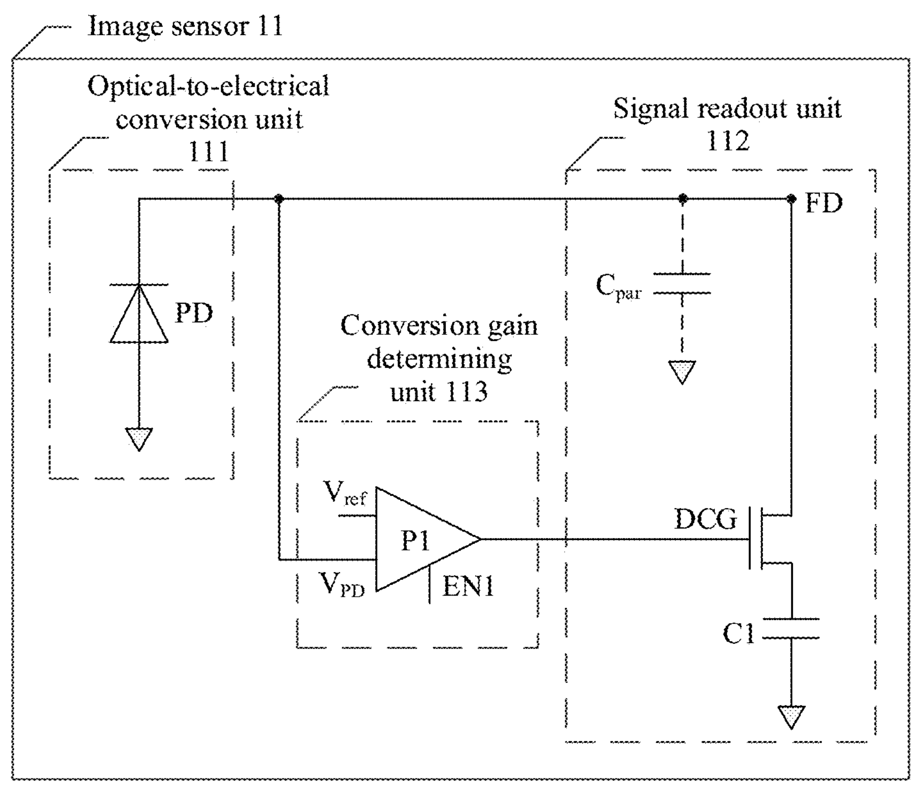
FIG. 4 is a diagram of another structure of an image sensor according to this application.

FIG. 4 is a diagram of another structure of an image sensor according to this application. As shown in FIG. 4, an image sensor 11 includes an optical-to-electrical conversion unit 111, a signal readout unit 112, and a conversion gain determining unit 113, the optical-to-electrical conversion unit 111 includes a reverse biased photodiode PD, the signal readout unit 112 includes an FD node, a dual conversion gain transistor DCG, and a first capacitor C1, and the conversion gain determining unit 113 is a comparator P1. The FD node is configured to store a charge corresponding to an electrical signal obtained by converting incident light by the photodiode.

Herein, the dual conversion gain transistor DCG may be any one of a metal-oxide-semiconductor field-effect transistor (MOSFET), an insulated gate bipolar transistor (IGBT), or a gallium nitride (GaN) transistor. In this embodiment of this application, the dual conversion gain transistor DCG is described by using the MOSFET as an example.

Both a cathode of the photodiode PD and a drain of the dual conversion gain transistor DCG are connected to the FD node, a source of the dual conversion gain transistor DCG is connected to one end of the first capacitor C1, and both an anode of the photodiode PD and the other end of the first capacitor C1 are connected to a reference ground. An input end and an output end of the comparator P1 are connected to the cathode of the photodiode PD and a gate of the dual conversion gain transistor DCG respectively.

In an optional embodiment, after the photodiode PD is exposed, the comparator P1 compares a magnitude of a cathode voltage $V_{PD}$ of the photodiode PD with a magnitude of a reference voltage $V_{ref}$, and outputs a control voltage based on a comparison result, and the control voltage is used to control the dual conversion gain transistor DCG to be turned on or off. Therefore, the first capacitor C1 is connected or not connected between the drain of the dual conversion gain transistor DCG and the reference ground, that is, a capacitance at the FD node is changed, so that the image sensor 11 can automatically select a conversion gain mode (namely, an HCG mode or an LCG mode) based on intensity of the incident light, to ensure that the image sensor 11 needs to collect a reset voltage and a signal voltage only once and an ADC needs to operate only once, thereby reducing operation costs and power consumption of the image sensor 11, increasing a frame rate, and achieving high applicability.

Figure 5:
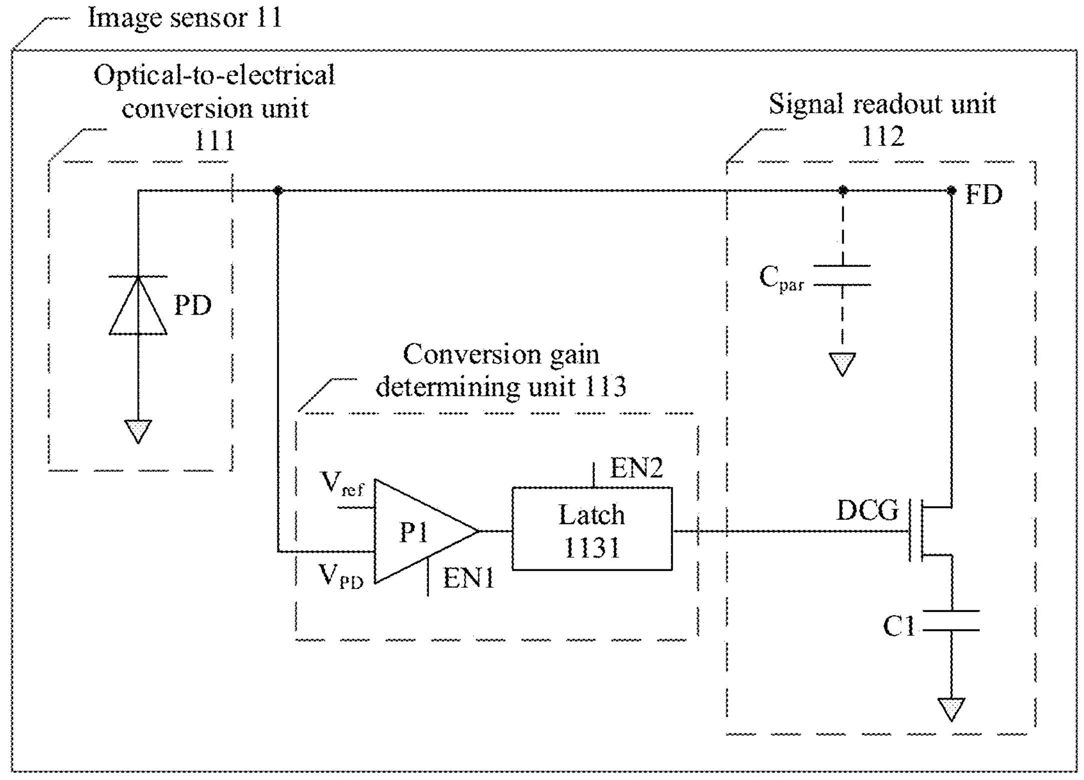
FIG. 5 is a diagram of another structure of an image sensor according to this application.

FIG. 5 is a diagram of another structure of an image sensor according to this application. As shown in FIG. 5, an image sensor 11 includes an optical-to-electrical conversion unit 111, a signal readout unit 112, and a conversion gain determining unit 113, the optical-to-electrical conversion unit 111 includes a photodiode PD, the signal readout unit 112 includes an FD node, a dual conversion gain transistor DCG, and a first capacitor C1, and the conversion gain determining unit includes a comparator P1 and a latch 1131. An input end of the comparator P1 is connected to a cathode of the photodiode PD, and an output end of the comparator P1 is connected to a gate of the dual conversion gain transistor DCG through the latch 1131. Herein, for a connection relationship between parts other than the conversion gain determining unit 113 in the image sensor 11, refer to descriptions of corresponding parts in the embodiment shown in FIG. 4.

In an optional embodiment, after the photodiode PD is exposed, the comparator P1 compares a magnitude of a cathode voltage $V_{PD}$ of the photodiode PD with a magnitude of a reference voltage $V_{ref}$, and outputs a control voltage to the latch 1131 based on a comparison result. The latch 1131 outputs a control voltage to the gate of the dual conversion gain transistor DCG based on the control voltage output by the comparator P1, so that a gate voltage of the DCG is kept at the control voltage, and the control voltage is used to control the dual conversion gain transistor DCG to be turned on or off. Therefore, the first capacitor C1 is connected or not connected between a drain of the dual conversion gain transistor DCG and a reference ground, that is, a capacitance at the FD node is changed, so that the image sensor 11 can automatically select a conversion gain mode (namely, an HCG mode or an LCG mode) based on intensity of incident light, to ensure that the image sensor 11 needs to collect a reset voltage and a signal voltage only once and an ADC needs to operate only once, thereby reducing operation costs and power consumption of the image sensor 11, and increasing a frame rate. In addition, the image sensor 11 may further ensure, via the latch 1131, that the control voltage does not fluctuate with a change of external light after the conversion gain mode is selected, so that the control voltage can be stably output. This improves stability of the image sensor 11, and achieves high applicability.

Figure 6:
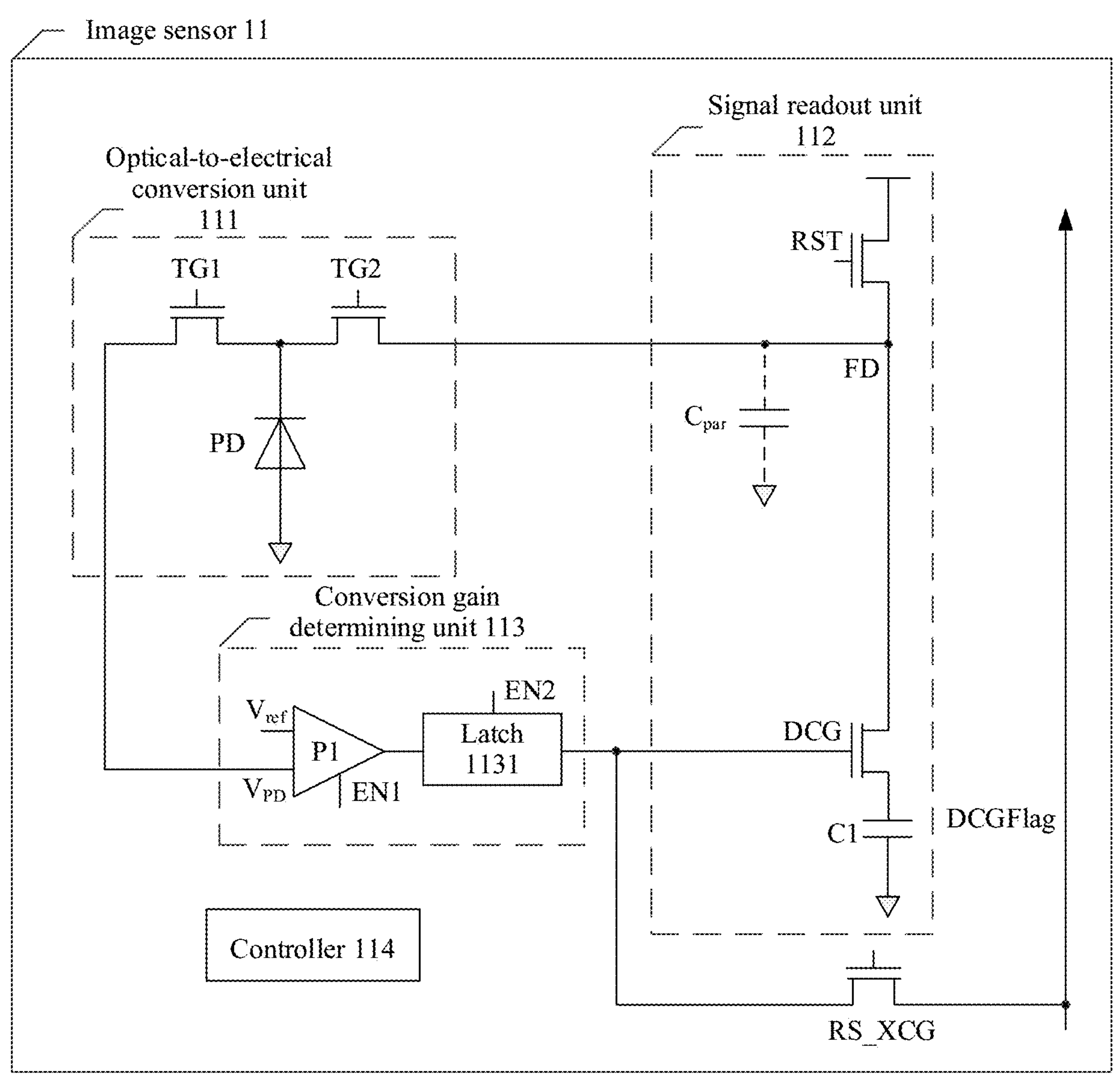
FIG. 6 is a diagram of another structure of an image sensor according to this application.

FIG. 6 is a diagram of another structure of an image sensor according to this application. As shown in FIG. 6, an image sensor 11 includes an optical-to-electrical conversion unit 111, a signal readout unit 112, a conversion gain determining unit 113, and a controller 114, the optical-to-electrical conversion unit 111 includes a photodiode PD, a first charge transmission gate TG1, and a second charge transmission gate TG2, and the signal readout unit 112 includes an FD node, a dual conversion gain transistor DCG, a first capacitor C1, and a reset transistor RST. The image sensor 11 further includes a first switch RS_XCG and a signal line DCGFlag. Herein, the dual conversion gain transistor DCG, the first charge transmission gate TG1, the second charge transmission gate TG2, and the first switch RS_XCG each may be any one of an MOSFET, an IGBT, or a GaN transistor. In this embodiment of this application, the MOSFET is used as an example to describe the dual conversion gain transistor DCG, the first charge transmission gate TG1, the second charge transmission gate TG2, and the first switch RS_XCG. A cathode of the photodiode PD is connected to the FD node through the second charge transmission gate TG2, and the cathode of the photodiode PD and a drain of the second charge transmission gate TG2 are connected to an input end of the comparator P1 through the first charge transmission gate TG1. An output end of the comparator P1 is connected to an input end of the latch 1131, and an output end of the latch 1131 is connected to a gate of the dual conversion gain transistor DCG and a drain of the first switch RS_XCG, and a source of the first switch RS_XCG is connected to the signal line DCGFlag. The comparator P1 further includes an enable end EN1, the enable end EN1 is configured to receive a first control signal output by the controller 114, the first control signal is used to control an operating status of the comparator P1, the latch 1131 further includes an enable end EN2, the enable end EN2 is configured to receive a second control signal output by the controller 114, and the second control signal is used to control an operating status of the latch 1131. Herein, for a connection relationship between elements in the signal readout unit 112, refer to descriptions of corresponding parts in the embodiment shown in FIG. 4.

In an optional implementation, before the photodiode is exposed, the controller 114 controls the reset transistor RST and the second charge transmission gate TG2 to be turned on and then turned off, to reset a voltage of the FD node and a cathode voltage of the photodiode PD, thereby improving accuracy of a subsequently collected reset voltage and signal voltage. Then, the photodiode PD starts to be exposed, and after the photodiode PD is exposed, the photodiode PD converts received light into the cathode voltage of the photodiode PD. Then, after the photodiode PD is exposed for first preset duration Δt1, the controller 114 controls the first charge transmission gate TG1 to be turned on. After the first charge transmission gate TG1 is turned on for second preset duration Δt2, the first control signal and the second control signal are output to the enable end EN1 of the comparator P1 and the enable end EN2 of the latch 1131 respectively, so that both the comparator P1 and the latch 1131 start to operate.

Specifically, after the enable end EN1 of the comparator P1 receives the first control signal, the comparator P1 starts to compare a magnitude of the cathode voltage $V_{PD}$ of the photodiode PD with a magnitude of the reference voltage $V_{ref}$, and outputs a control voltage to the latch 1131 based on a comparison result. When the enable end EN2 of the latch 1131 receives the second control signal, the latch 1131 outputs a control voltage to the gate of the dual conversion gain transistor DCG based on the voltage (namely, the control voltage) input by the input end of the latch 1131, so that a gate voltage of the dual conversion gain transistor DCG is kept at the control voltage. In addition, after the latch 1131 outputs the control voltage, the controller 114 controls the first switch RS_XCG to be turned on, so that the control voltage is output to an image processor outside the image sensor 11 through the signal line DCGFlag. After the image sensor 11 outputs the control voltage through the signal line DCGFlag, the controller 114 controls the first switch RS_XCG to be turned off. The control voltage represents a capacitance at the FD node. Specifically, when the control voltage is “0”, it indicates that the capacitance $C_{FD}$ at the FD node is equal to $C_{par}$. Therefore, it indicates that the image sensor 11 enters an HCG mode. When the control voltage is “1”, it indicates that the capacitance $C_{FD}$ at the FD node is equal to $C1+C_{par}$. Therefore, it indicates that the image sensor 11 enters an LCG mode.

In an optional embodiment, after the enable end EN1 of the comparator P1 and the enable end EN2 of the latch 1131 receive the first control signal and the second control signal respectively, when the cathode voltage $V_{PD}$ of the photodiode PD is greater than the reference voltage $V_{ref}$, it indicates that the photodiode PD generates fewer photogenerated electrons, that is, the photodiode PD receives weaker light. In this case, the comparator P1 outputs a low-voltage control voltage “O” to the latch 1131, so that the latch 1131 outputs the low-voltage control voltage “0” to the gate of the dual conversion gain transistor DCG, and the dual conversion gain transistor DCG is in a turn-off state. In this case, the capacitance $C_{FD}$ at the FD node is equal to $C_{par}$, so that the image sensor 11 enters the HCG mode. In addition, after the latch 1131 outputs the low-voltage control voltage “0”, the controller 114 controls the first switch RS_XCG to be turned on, so that the control voltage “0” is output outside the image sensor 11 through the signal line DCGFlag. Therefore, the image sensor 11 outputs the control voltage “O” to the image processor outside the image sensor 11, to transfer, to the image processor, the subsequently collected reset voltage and signal voltage that are collected when the image sensor 11 is in the HCG mode. This facilitates subsequent image processing, and improves accuracy of a final image. After the image sensor 11 outputs the control voltage “0” through the signal line DCGFlag, the controller 114 controls the first switch RS_XCG to be turned off.

In another optional embodiment, after the enable end EN1 of the comparator P1 and the enable end EN2 of the latch 1131 receive the first control signal and the second control signal respectively, when the cathode voltage $V_{PD}$ of the photodiode PD is less than the reference voltage $V_{ref}$, it indicates that the photodiode PD generates more photogenerated electrons, that is, the photodiode PD receives stronger light. In this case, the comparator P1 outputs a high-voltage control voltage “1” to the latch 1131, so that the latch 1131 outputs the high-voltage control voltage “1” to the gate of the dual conversion gain transistor DCG, and the dual conversion gain transistor DCG is in a turn-on state. In this case, the capacitance $C_{FD}$ at the FD node is equal to $C1+C_{par}$, so that the image sensor 11 enters the LCG mode. In addition, after the latch 1131 outputs the high-voltage control voltage “1”, the controller 114 controls the first switch RS_XCG to be turned on, so that the control voltage “1” is output outside the image sensor 11 through the signal line DCGFlag. Therefore, the image sensor 11 outputs the control voltage “1” to the image processor outside the image sensor 11, to inform the image processor that the subsequently collected reset voltage and signal voltage are collected when the image sensor 11 is in the LCG mode. This facilitates subsequent image processing, and improves accuracy of a final image. After the image sensor 11 outputs the control voltage “1” through the signal line DCGFlag, the controller 114 controls the first switch RS_XCG to be turned off.

After the comparator P1 operates for third preset duration Δt3, the controller 114 stops outputting the first control signal to the enable end EN1 of the comparator P1, so that the comparator P1 stops operating. After the comparator P1 stops operating, in other words, after the image sensor 11 determines a corresponding conversion gain mode (namely, the LCG mode or the HCG mode) based on intensity of incident light, the controller 114 controls the second charge transmission gate TG2 to be turned on for fourth preset duration Δt4 and then turned off. After the second charge transmission gate TG2 is turned off, the controller 114 obtains the voltage of the FD node to obtain the signal voltage. It may be understood that, because the image sensor 11 has selected, before the second charge transmission gate TG2 is turned on, a conversion gain mode corresponding to the intensity of the incident light, it can be ensured that the FD node has well capacity corresponding to the incident light to store all photogenerated electrons exported from the photodiode PD. Therefore, when the signal voltage is collected, the second charge transmission gate TG2 needs to be turned on only once, to avoid a non-linear problem caused by the second charge transmission gate TG2 being turned on for the second time, thereby improving stability of the image sensor 11.

After the signal voltage is obtained, the controller 114 controls the first charge transmission gate TG1 to be turned off. In addition, after the signal voltage is obtained, the controller 114 stops outputting the second control signal to the enable end EN2 of the latch 1131, so that the latch 1131 stops operating. It may be understood that, when the comparator P1 operates, the first charge transmission gate TG1 is turned on. After the conversion gain mode corresponding to the intensity of the incident light is determined, the first charge transmission gate TG1 is still in a turn-on state, to help all the photogenerated electrons enter the FD node as much as possible, thereby improving accuracy of the collected signal voltage. In addition, the latch 1131 stops operating only after the signal voltage is obtained. This can ensure that the image sensor 11 is not affected by a change of external light in a voltage collection process, can further improve accuracy of the collected voltages (namely, the reset voltage and the signal voltage), and can achieve high applicability.

In this embodiment of this application, the image sensor 11 can automatically determine, based on the intensity of the light received by the photodiode PD, the conversion gain mode corresponding to the intensity of the light, to ensure that the image sensor 11 needs to collect the reset voltage and the signal voltage only once and an ADC needs to operate only once, thereby reducing operation costs and power consumption of the image sensor 11, increasing a frame rate, and achieving high applicability.

Figure 7:
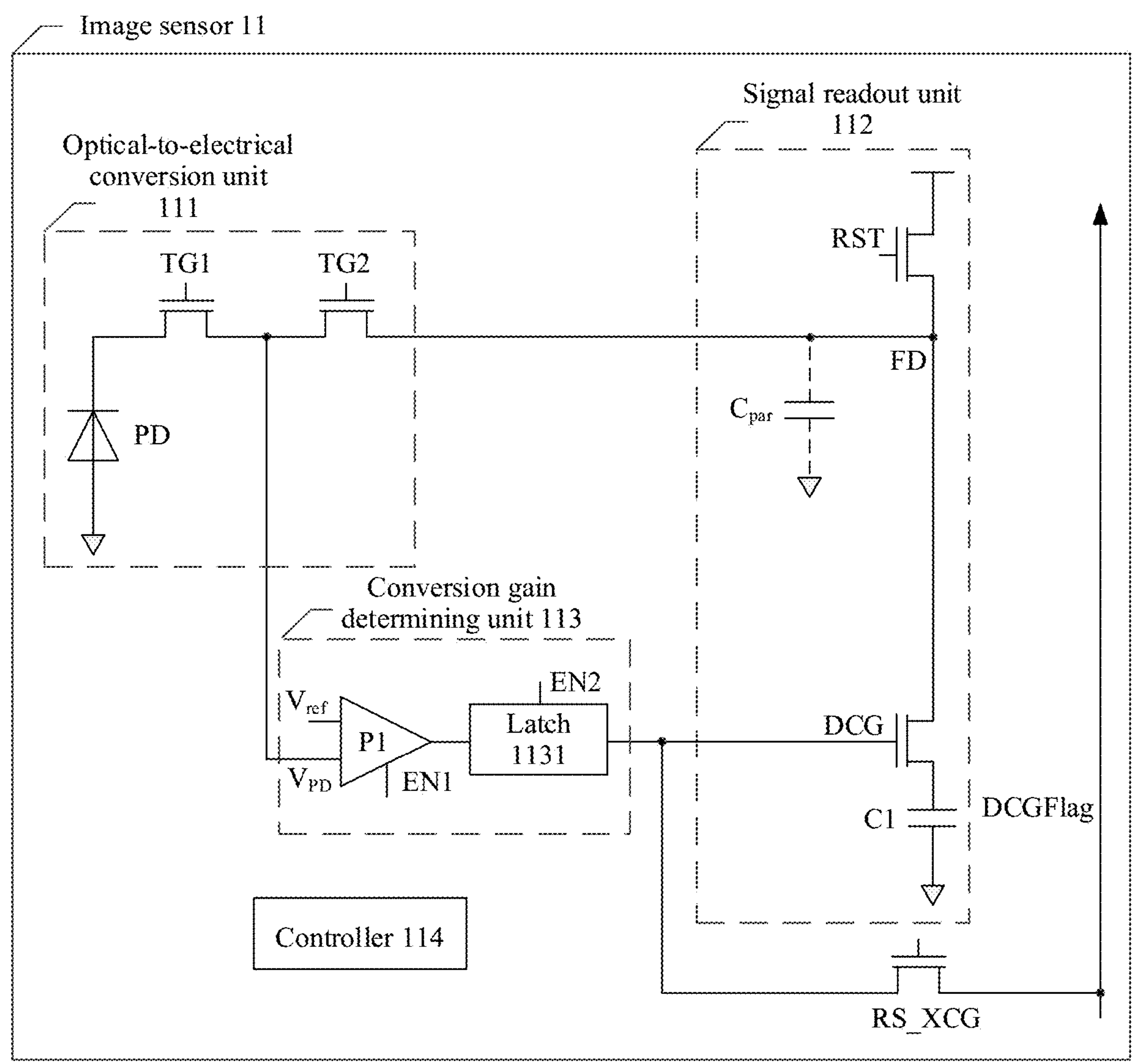
FIG. 7 is a diagram of another structure of an image sensor according to this application.

FIG. 7 is a diagram of another structure of an image sensor according to this application. As shown in FIG. 7, an image sensor 11 includes an optical-to-electrical conversion unit 111, a signal readout unit 112, a conversion gain determining unit 113, a controller 114, a first switch RS_XCG, and a signal line DCGFlag, and the optical-to-electrical conversion unit 111 includes a photodiode PD, a first charge transmission gate TG1, and a second charge transmission gate TG2. Herein, the dual conversion gain transistor DCG, the first charge transmission gate TG1, the second charge transmission gate TG2, and the first switch RS_XCG each may be any one of an MOSFET, an IGBT, or a GaN transistor. In this embodiment of this application, the MOSFET is used as an example to describe the dual conversion gain transistor DCG, the first charge transmission gate TG1, the second charge transmission gate TG2, and the first switch RS_XCG. A cathode of the photodiode PD is connected to a drain of the second charge transmission gate TG2 and an input end of the comparator P1 through the first charge transmission gate TG1. Herein, for a connection relationship between parts other than the optical-to-electrical conversion unit 111 in the image sensor 11 and a connection relationship between elements inside the optical-to-electrical conversion unit 111, refer to descriptions of corresponding parts in the embodiment shown in FIG. 6.

Herein, a working principle of the image sensor 11 shown in FIG. 7 is consistent with a working principle of the image sensor 11 shown in FIG. 6. Details are not described herein again.

In this embodiment of this application, the image sensor 11 can automatically determine, based on intensity of light received by the photodiode PD, a conversion gain mode corresponding to the intensity of the light, to ensure that the image sensor 11 needs to collect a reset voltage and a signal voltage only once and an ADC needs to operate only once, thereby reducing operation costs and power consumption of the image sensor 11, increasing a frame rate, and achieving high applicability.

Both the image sensor 11 in the optical-to-electrical conversion unit 111 shown in FIG. 6 and the image sensor 11 in the optical-to-electrical conversion unit 111 shown in FIG. 7 have the same working principle. For ease of description, the following separately describes the image sensor in a rolling shutter mode and the image sensor in a global shutter mode by using the optical-to-electrical conversion unit 111 shown in FIG. 6 as an example.

Figure 8:
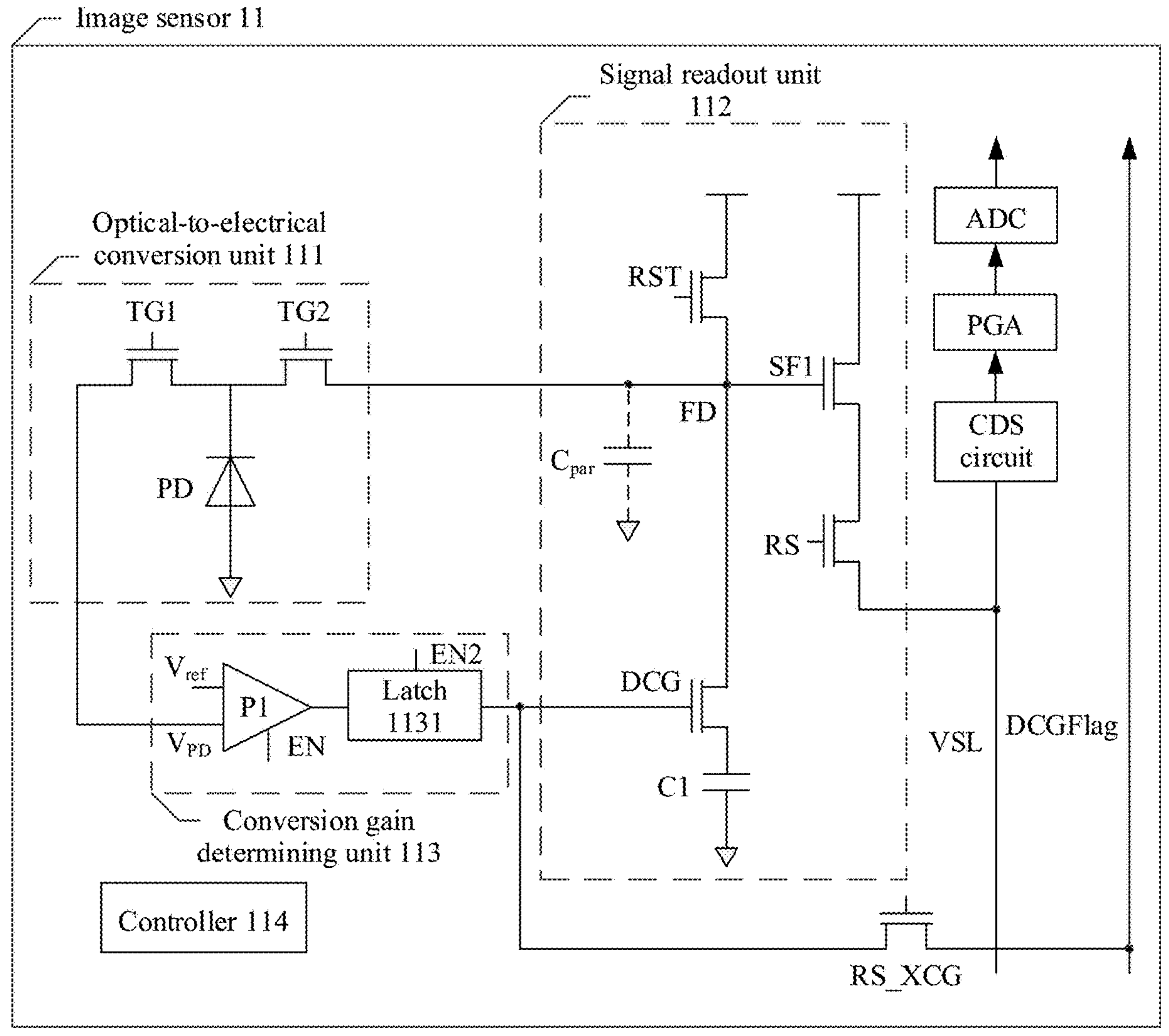
FIG. 8 is a diagram of another structure of an image sensor according to this application.

FIG. 8 is a diagram of another structure of an image sensor according to this application. As shown in FIG. 8, the image sensor 11 includes an optical-to-electrical conversion unit 111, a signal readout unit 112, a conversion gain determining unit 113, and a controller 114. The optical-to-electrical conversion unit 111 includes a photodiode PD, a first charge transmission gate TG1, and a second charge transmission gate TG2. The signal readout unit 112 includes an FD node, a dual conversion gain transistor DCG, a first capacitor C1, a reset transistor RST, a first source follower SF1, and a row selector RS. The image sensor 11 further includes a first switch RS_XCG, a signal line DCGFlag, a vertical signal line (VSL), a correlated double sampling (CDS) circuit, a variable gain amplifier (PGA), and an analog-to-digital converter (ADC). Herein, the dual conversion gain transistor DCG, the first charge transmission gate TG1, the second charge transmission gate TG2, the reset transistor RST, the first source follower SF1, the row selector RS, and the first switch RS_XCG each may be any one of an MOSFET, an IGBT, or a GaN transistor. In this embodiment of this application, all the foregoing switching transistors are described by using the MOSFET as an example.

A source of the second charge transmission gate TG2, a source of the reset transistor RST, a drain of the dual conversion gain transistor DCG, and a gate of the first source follower SF1 are connected, and the FD node is formed at the joint. A drain and a source of the first source follower SF1 are connected to a power supply and a drain of the row selector RS respectively, and a source of the row selector RS is connected to the CDS circuit through the VSL. Herein, for a connection relationship that is not described in the image sensor 11, refer to descriptions of a corresponding part in the embodiment shown in FIG. 5.

In an optional implementation, after the image sensor 11 operates, the photodiode PD starts to be exposed, and the photodiode PD converts received light into a cathode voltage of the photodiode PD. Then, after the photodiode PD is exposed for first preset duration Δt1, the controller 114 controls the first charge transmission gate TG1 to be turned on, and outputs a first control signal and a second control signal to an enable end EN1 of a comparator P1 and an enable end EN2 of a latch 1131 respectively after the first charge transmission gate TG1 is turned on for second preset duration Δt2, so that both the comparator P1 and the latch 1131 start to operate. Specifically, after the enable end EN1 of the comparator P1 and the enable end EN2 of the latch 1131 receive the first control signal and the second control signal respectively, the comparator P1 compares a magnitude of the cathode voltage $V_{PD}$ of the photodiode PD with a magnitude of a reference voltage $V_{ref}$, and outputs a control voltage to the latch 1131 based on a comparison result. The latch 1131 outputs a control voltage to a gate of the dual conversion gain transistor DCG based on the control voltage output by the comparator P1, so that a gate voltage of the dual conversion gain transistor DCG is kept at the control voltage, the dual conversion gain transistor DCG is controlled to be stably in a turn-on state or a turn-off state when the enable end EN2 of the latch 1131 receives the second control signal, and the image sensor 11 is in an HCG mode or an LCG mode.

After the comparator P1 operates for third preset duration Δt3, the controller 114 stops outputting the first control signal to the enable end EN1 of the comparator P1, so that the comparator P1 stops operating. After the comparator P1 stops operating, in other words, after the image sensor 11 determines a corresponding conversion gain mode (namely, the LCG mode or the HCG mode) based on intensity of incident light, the controller 114 controls the reset transistor RST to be turned on for fifth preset duration Δt5 and then turned off. After the reset transistor RST is turned off, a voltage of the FD node is obtained to obtain the reset voltage. Specifically, after the reset transistor RST is turned off, the controller 114 controls the row selector RS to be turned on, and controls the CDS circuit to obtain a source voltage of the row selector RS, namely, a voltage on the VSL, to obtain the reset voltage.

After the reset voltage is obtained, the controller 114 controls the second charge transmission gate TG2 to be turned on. After the second charge transmission gate TG2 is turned on for fourth preset duration Δt4, the controller 114 controls the second charge transmission gate TG2 to be turned off. After the second charge transmission gate TG2 is turned off, the controller 114 obtains the voltage of the FD node to obtain a signal voltage. Specifically, after the second charge transmission gate TG2 is turned off, the controller 114 controls the CDS circuit to obtain the source voltage of the row selector RS, namely, the voltage on the VSL, to obtain the signal voltage.

After the signal voltage is obtained, the controller 114 controls the row selector RS and the first charge transmission gate TG1 to be turned off. In addition, the controller 114 stops outputting the second control signal to the enable end EN2 of the latch 1131, so that the latch 1131 stops operating.

In addition, after the signal voltage is obtained, the CDS circuit calculates a difference between the reset voltage and the signal voltage based on the collected reset voltage and signal voltage, to complete correlated double sampling. Then, the CDS circuit outputs the difference to the PGA, the PGA amplifies the difference and outputs an amplified difference to the ADC, and the ADC converts the amplified difference into a digital signal and outputs the digital signal to the image processor.

It should be noted that, before the photodiode PD is exposed, the controller 114 further controls the reset transistor RST and the second charge transmission gate TG2 to be turned on for eighth preset duration Δt6 and then turned off, to ensure that resetting of the voltage $V_{FD}$ of the FD node and the cathode voltage $V_{PD}$ of the photodiode PD is completed before the reset voltage and the signal voltage are collected, thereby improving accuracy of the collected reset voltage and signal voltage.

In this embodiment of this application, the image sensor 11 is applicable to a rolling shutter mode, and can automatically determine, based on intensity of the light received by the photodiode PD, a conversion gain mode corresponding to the intensity of the light, to ensure that the image sensor 11 needs to collect a reset voltage and a signal voltage only once and the ADC needs to operate only once, thereby reducing operation costs and power consumption of the image sensor 11, increasing a frame rate, and achieving high applicability.

Figure 9:
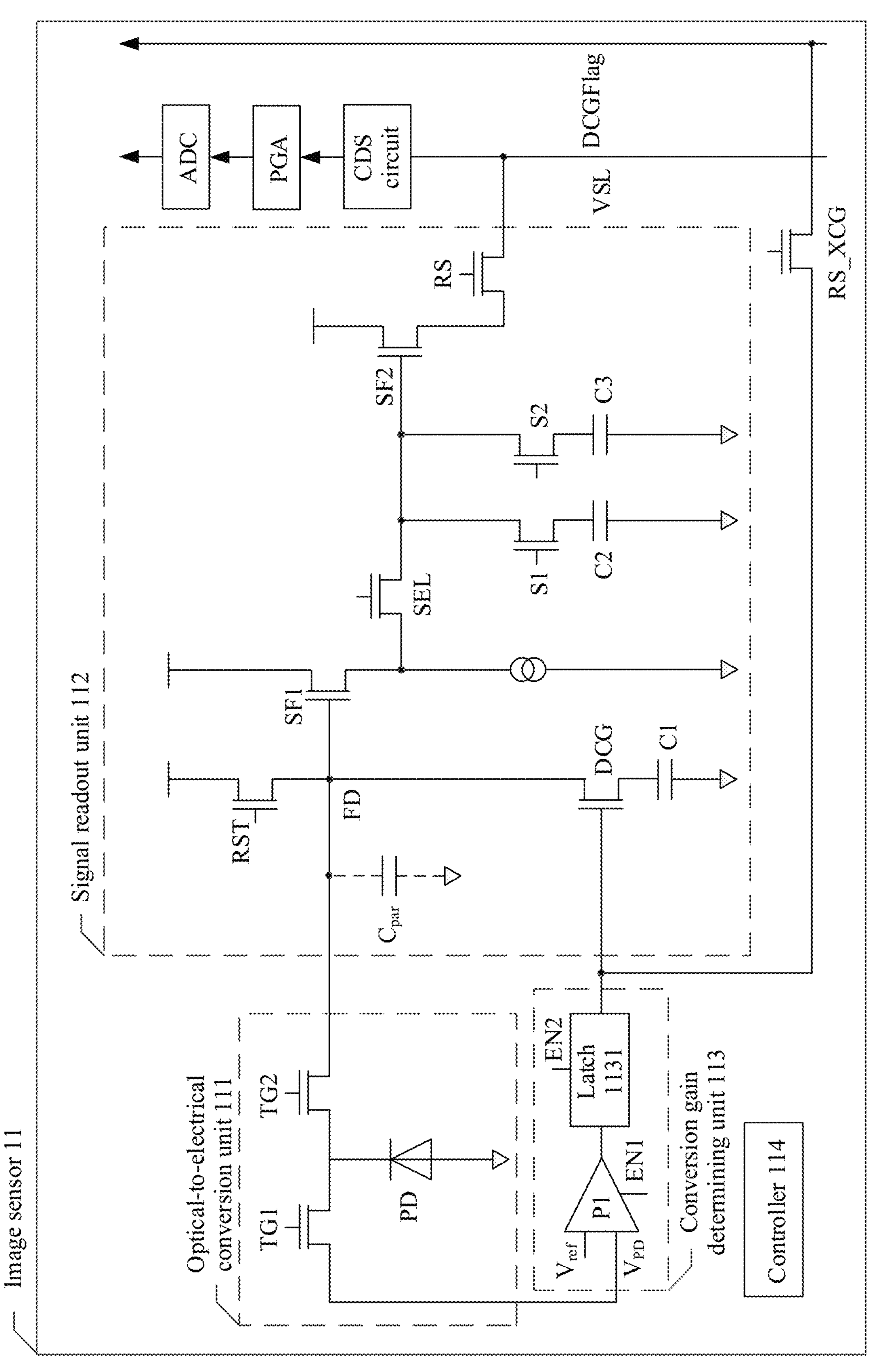
FIG. 9 is a diagram of another structure of an image sensor according to this application.

FIG. 9 is a diagram of another structure of an image sensor according to this application. As shown in FIG. 9, the image sensor 11 includes an optical-to-electrical conversion unit 111, a signal readout unit 112, a conversion gain determining unit 113, and a controller 114. The signal readout unit 112 includes an FD node, a dual conversion gain transistor DCG, a first capacitor C1, a reset transistor RST, a first source follower SF1, a second switch SEL, a third switch S1, a fourth switch S2, a second capacitor C2, a third capacitor C3, a second source follower SF2, and a row selector RS. The image sensor 11 further includes a first switch RS_XCG, a signal line DCGFlag, a VSL, a CDS circuit, a PGA, and an ADC. Herein, the dual conversion gain transistor DCG, the first charge transmission gate TG1, the second charge transmission gate TG2, the reset transistor RST, the first source follower SF1, the second source follower SF2, the first switch RS_XCG, the second switch SEL, the third switch S1, the fourth switch S2, and the row selector RS each may be any one of an MOSFET, an IGBT, or a GaN transistor. In this embodiment of this application, all the foregoing switching transistors are described by using the MOSFET as an example.

A source of the reset transistor RST, a source of the second charge transmission gate TG2, a drain of the dual conversion gain transistor DCG, and a gate of the first source follower SF1 are connected, and the FD node is formed at the joint. A drain of the reset transistor RST, a drain of the first source follower SF1, and a drain of the second source follower SF2 are all connected to a power supply, a source of the first source follower SF1 is connected to a drain of the second switch SEL, a source of the second switch SEL is connected to a drain of the second source follower SF2, a source of the second source follower SF2 is connected to a drain of the row selector RS, and a source of the row selector RS is connected to the CDS circuit through the VSL. A source of the dual conversion gain transistor DCG is connected to a reference ground through the first capacitor C1, a gate of the dual conversion gain transistor DCG is connected to an output end of the latch 1131, a drain of the third switch S1 is connected to the source of the second switch SEL, a source of the third switch S1 is connected to the reference ground through the second capacitor C2, a drain of the fourth switch S2 is connected to the source of the second switch SEL, and a source of the fourth switch S2 is connected to the reference ground through the third capacitor C3. Herein, for a connection relationship between parts other than the signal readout unit 112 in the image sensor 11, refer to descriptions of corresponding parts in the embodiment shown in FIG. 8.

In an optional implementation, after the image sensor 11 starts to operate, the controller 114 controls the reset transistor RST and the second charge transmission gate TG2 to be turned on for eighth preset duration Δt6 and then turned off, to complete resetting of a voltage $V_{FD}$ of the FD node and a cathode voltage $V_{PD}$ of the photodiode PD, thereby improving accuracy of a collected reset voltage and signal voltage. Then, the photodiode PD starts to be exposed, and the photodiode PD converts received light into the cathode voltage of the photodiode PD. Then, after the photodiode PD is exposed for first preset duration Δt1, the controller 114 controls the first charge transmission gate TG1 to be turned on. After the first charge transmission gate TG1 is turned on for second preset duration Δt2, the controller 114 outputs a first control signal and a second control signal to an enable end EN1 of a comparator P1 and an enable end EN2 of the latch 1131 respectively, so that the comparator P1 and the latch 1131 start to operate based on the received first control signal and the received second control signal respectively. In other words, the comparator P1 compares a magnitude of the cathode voltage $V_{PD}$ of the photodiode PD with a magnitude of the reference voltage $V_{ref}$, and outputs a control voltage to the latch 1131 based on a comparison result. The latch 1131 outputs a control voltage to the gate of the dual conversion gain transistor DCG based on the control voltage output by the comparator P1, so that a gate voltage of the dual conversion gain transistor DCG is kept at the control voltage, the dual conversion gain transistor DCG is controlled to be stably in a turn-on state or a turn-off state when the enable end EN2 of the latch 1131 receives the second control signal, and the image sensor 11 is in an HCG mode or an LCG mode.

After the comparator P1 operates for third preset duration Δt3, the controller 114 stops outputting the first control signal to the enable end EN1 of the comparator P1, so that the comparator P1 stops operating. After the comparator P1 stops operating, in other words, after the image sensor 11 enters a conversion gain mode corresponding to the light, the controller 114 controls the reset transistor RST to be turned on for fifth preset duration Δt5 and then turned off. After the reset transistor RST is turned off, the controller 114 controls the second charge transmission gate TG2 to be turned on, and controls the second charge transmission gate TG2 to be turned off after the second charge transmission gate TG2 is turned on for fourth preset duration Δt4. After the second charge transmission gate TG2 is turned off, the controller 114 obtains the voltage of the FD node to obtain a reset voltage, and after the reset voltage is obtained, the controller 114 obtains the voltage of the FD node to obtain a signal voltage. After the signal voltage is obtained, the controller 114 stops outputting the second control signal to the enable end of the latch 1131, so that the latch 1131 stops operating; and controls the first charge transmission gate TG1 to be turned off.

Figure 10:
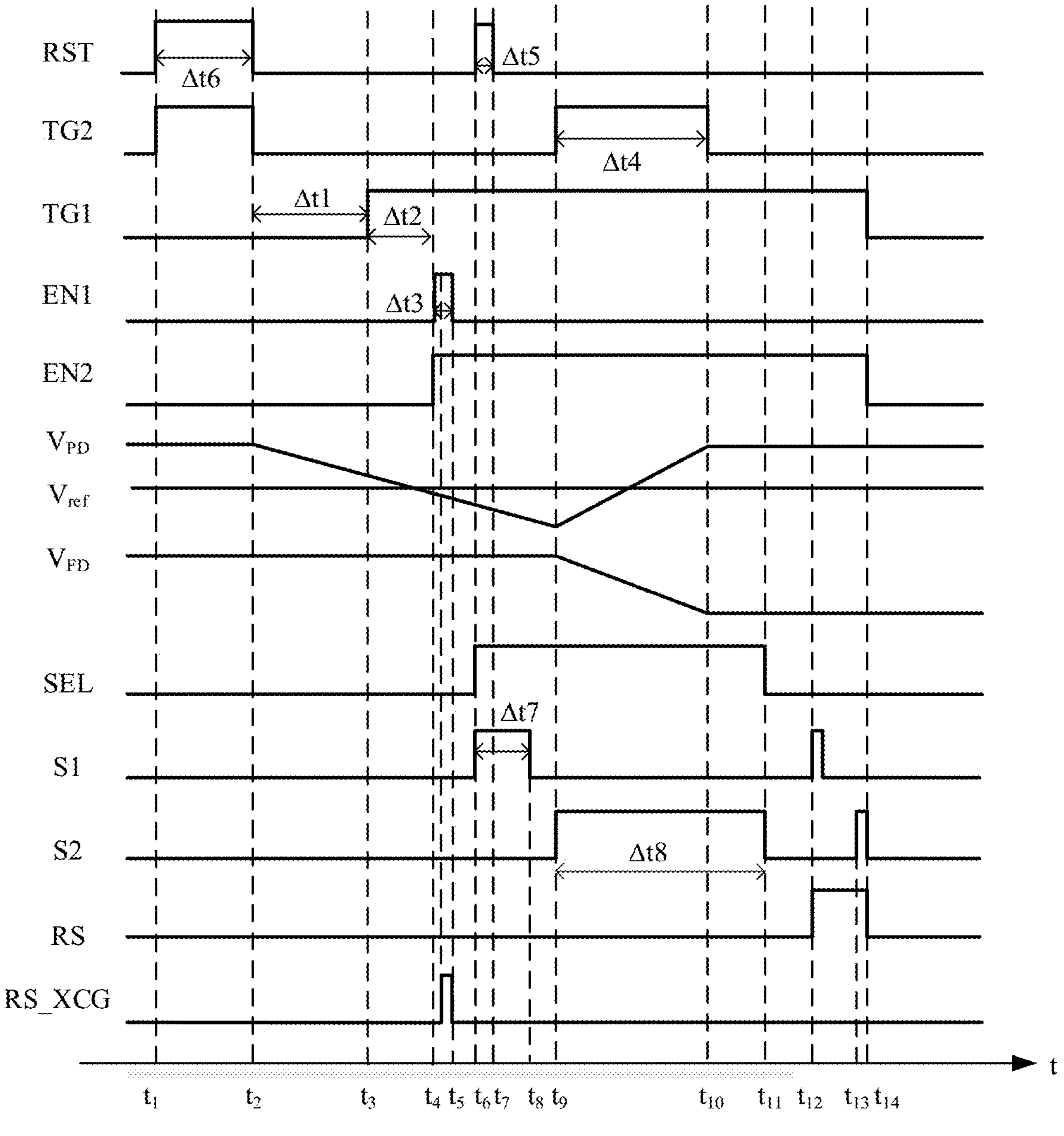
FIG. 10 is a control timing diagram of an image sensor according to an embodiment of this application.
Figure 11:
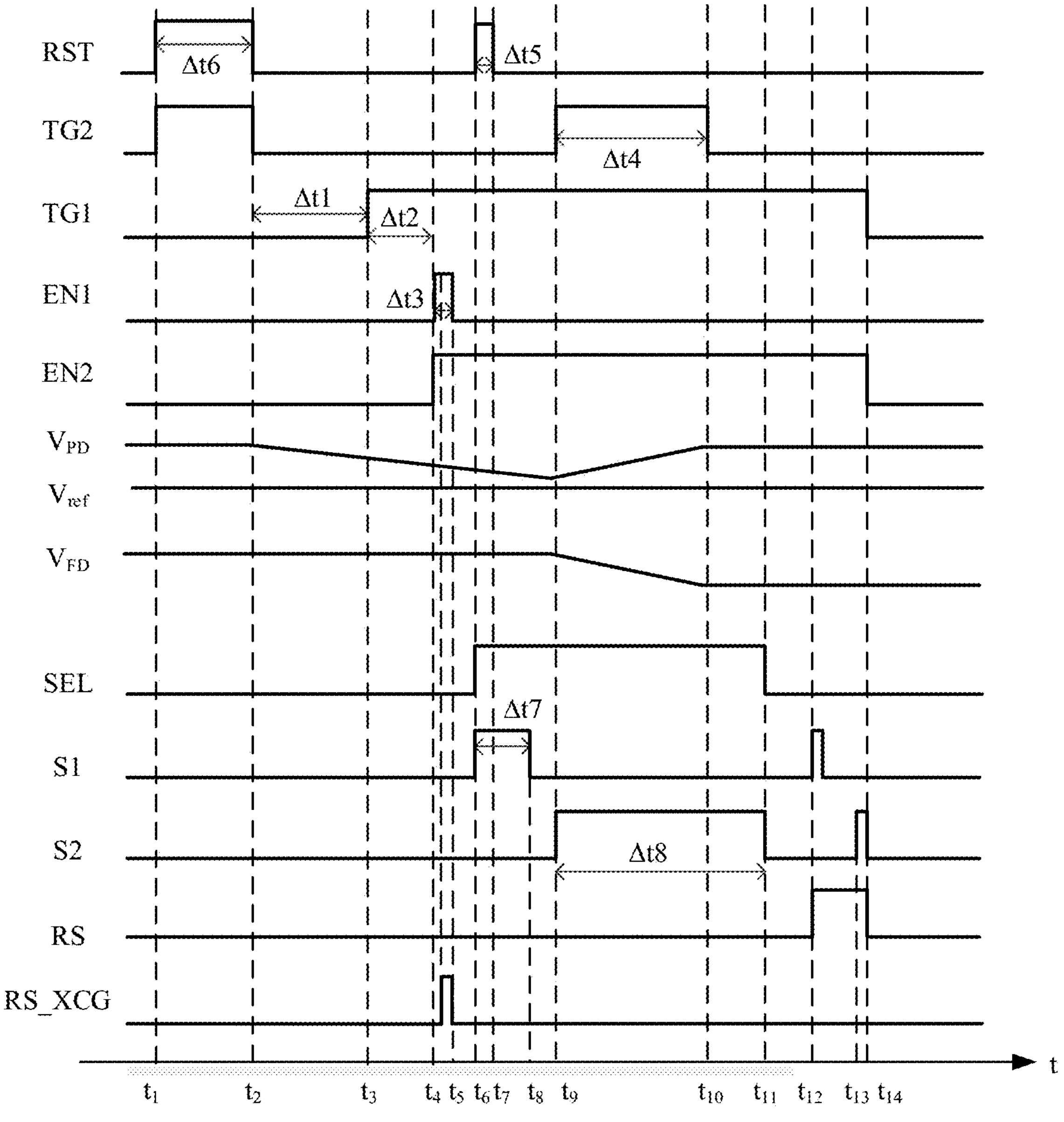
FIG. 11 is another control timing diagram of an image sensor according to an embodiment of this application.

For ease of understanding, the following describes a working principle of an image sensor 11 in a global shutter mode with reference to control timing diagrams of the image sensor in FIG. 10 and FIG. 11.

FIG. 10 is a control timing diagram of an image sensor according to an embodiment of this application. As shown in FIG. 10, after the image sensor 11 starts to operate, the controller 114 outputs a high level to both a gate of a reset transistor RST and a gate of a second charge transmission gate TG2 at a moment $t_1$, to control the reset transistor RST and the second charge transmission gate TG2 to be turned on, to start to reset a voltage $V_{FD}$ of an FD node and a cathode voltage $V_{PD}$ of a photodiode PD.

At a moment $t_2$, that is, after the reset transistor RST and the second charge transmission gate TG2 are turned on for eighth preset duration Δt6, the controller 114 outputs a low level to both the gate of the reset transistor RST and a gate of the second charge transmission gate TG2, to control the reset transistor RST and the second charge transmission gate TG2 to be turned off, to complete resetting of the voltage $V_{FD}$ of the FD node and the cathode voltage $V_{PD}$ of the photodiode PD. In addition, at the moment $t_2$, global shutter starts to be performed on the photodiode PD.

From the moment $t_2$ to a moment $t_3$, the cathode voltage $V_{PD}$ of the photodiode PD starts to decrease as intensity of received light increases.

At the moment $t_3$, that is, after the photodiode PD is exposed for first preset duration Δt1, the controller 114 outputs a high level to the gate of the first charge transmission gate TG1, to control the first charge transmission gate TG1 to be turned on.

From the moment $t_3$ to a moment $t_4$, the first charge transmission gate TG1 is in a turn-on state. In this time period, the cathode voltage $V_{PD}$ of the photodiode PD still decreases as the intensity of the received light increases.

At the moment $t_4$, that is, after the first charge transmission gate is turned on for second preset duration Δt2, the controller 114 outputs a high level to both an enable end EN1 of the comparator P1 and an enable end EN2 of the latch 1131, so that the comparator P1 and the latch 1131 start to operate.

From the moment $t_4$ to a moment $t_5$, the comparator P1 starts to compare a magnitude of the cathode voltage $V_{PD}$ of the photodiode PD with a magnitude of a reference voltage $V_{ref}$. Apparently, in this case, $V_{PD}$ is less than $V_{ref}$. It indicates that the intensity of the light received by the photodiode PD is high. The comparator P1 outputs a high-level control voltage $V_{P1}$ "1" to the latch 1131, and the latch outputs the control voltage $V_{P1}$ "1" to a gate of a dual conversion gain transistor DCG based on the control voltage $V_{P1}$ "1" output by the comparator P1. In this case, the dual conversion gain transistor DCG is turned on, a capacitance $C_{FD}$ at the FD node is equal to $C_{par}$+C1, and the image sensor 11 enters an LCG mode. In addition, after the latch 1131 outputs the control voltage $V_{P1}$ "1", the controller 114 controls a first switch RS_XCG to be turned on, so that the control voltage $V_{P1}$ "1" is output to an image processor outside the image sensor 11 through a signal line DCGFlag. After the image sensor 11 outputs the control voltage $V_{P1}$ "1", the controller 114 controls the first switch RS_XCG to be turned off.

At the moment $t_5$, the controller 114 stops outputting the high level to the enable end EN1 of the comparator P1, so that the comparator P1 stops operating.

At a moment to, the controller 114 outputs a high level to the gate of the reset transistor RST, a gate of the second switch SEL, and a gate of the third switch S1, so that the reset transistor RST, the second switch SEL, and the third switch S1 are all turned on, to start to reset the voltage $V_{FD}$ of the FD node.

At a moment $t_7$, that is, after the reset transistor RST is turned on for fifth preset duration Δt5, the controller 114 outputs a low level to the gate of the reset transistor RST, so that the reset transistor RST is turned off, to complete resetting of the voltage $V_{FD}$ of the FD node.

From the moment $t_7$ to a moment $t_5$, the reset voltage is stored into a second capacitor C2.

At the moment $t_5$, that is, after the reset transistor RST or the third switch S1 is turned on for sixth preset duration Δt6, the controller 114 outputs a low level to the gate of the third switch S1, so that the third switch S1 is turned off.

At a moment to, the controller 114 outputs a high level to the gate of the second charge transmission gate TG2 and a gate of the fourth switch S2, so that the second charge transmission gate TG2 and the fourth switch S2 are turned on.

At a moment $t_{10}$, that is, after the second charge transmission gate TG2 is turned on for fourth preset duration Δt4, that is, after photogenerated electrons in the photodiode PD are imported into the FD node, the controller 114 outputs a low level to the gate of the second charge transmission gate TG2, so that the second charge transmission gate TG2 is turned off.

From the moment $t_{10}$ to a moment $t_{11}$, a signal voltage is stored into a third capacitor C3.

At the moment $t_{11}$, that is, after the fourth switch S2 is turned on for seventh preset duration Δt8, the controller 114 outputs a low level to the gate of the second switch SEL and the gate of the fourth switch S2, so that both the second switch SEL and the fourth switch S2 are turned off.

At a moment $t_{12}$, the controller 114 outputs a high level to a gate of a row selector RS and the gate of the third switch S1, so that the row selector RS and the third switch S1 are turned on. In addition, the controller 114 controls a CDS circuit to collect a source voltage of the row selector RS, namely, a voltage on a VSL, to obtain a reset voltage. After the reset voltage is obtained, the controller 114 outputs a low level to the gate of the third switch S1, so that the third switch S1 is turned off.

At a moment $t_{13}$, the controller 114 outputs a high level to the gate of the fourth switch S2, so that the fourth switch S2 is turned on. In addition, the controller 114 controls the CDS circuit to collect the source voltage of the row selector RS, namely, the voltage on the VSL, to obtain a signal voltage.

At a moment $t_{14}$, that is, after the signal voltage is obtained, the controller 114 outputs a low level to the gate of the first charge transmission gate TG1, the gate of the fourth switch S2, and the gate of the row selector RS, so that the first charge transmission gate TG1, the fourth switch S2, and the row selector RS are all turned off. In addition, at the moment $t_{14}$, the controller 114 stops outputting the high level to the enable end EN2 of the latch 1131, so that the latch 1131 stops operating, that is, the latch 1131 no longer outputs the control voltage $V_{P1}$ "1." In addition, the CDS circuit calculates a difference between the reset voltage and the signal voltage based on the collected reset voltage and signal voltage, to complete correlated double sampling in the LCG mode. Then, the CDS circuit outputs the difference to a PGA, the PGA amplifies the difference and outputs an amplified difference to an ADC, and the ADC converts the amplified difference into a digital signal and outputs the digital signal to the image processor. Then, the image sensor 11 enters a next working period. One working period herein corresponds to a corresponding part from the moment $t_1$ to the moment $t_{14}$ shown in FIG. 10.

FIG. 11 is another control timing diagram of an image sensor according to an embodiment of this application. As shown in FIG. 11, after an image sensor 11 starts to operate, for control logic of a controller 114 from a moment $t_1$ to a moment $t_4$, refer to descriptions of a corresponding part in the control timing diagram shown in FIG. 10. Details are not described herein again.

From the moment $t_4$ to a moment $t_5$, a comparator P1 starts to compare a magnitude of a cathode voltage $V_{PD}$ of a photodiode PD with a magnitude of a reference voltage $V_{ref}$. Apparently, in this case, $V_{PD}$ is greater than $V_{ref}$. It indicates that intensity of light received by the photodiode PD is low. The comparator P1 outputs a low-level control voltage "0" to a latch 1131, and the latch outputs a control voltage "0" to a gate of a dual conversion gain transistor DCG based on the control voltage "0" output by the comparator P1. In this case, the dual conversion gain transistor DCG is turned off, a capacitance $C_{FD}$ at an FD node is equal to $C_{par}$, and the image sensor 11 enters an HCG mode. In addition, after the latch 1131 outputs the control voltage, the controller 114 controls a first switch RS_XCG to be turned on, so that the control voltage "0" is output to an image processor outside the image sensor 11 through a signal line DCGFlag. After the image sensor 11 outputs the control voltage "0", the controller 114 controls the first switch RS_XCG to be turned off.

Then, for control logic of the controller 114 from the moment $t_5$ to the moment $t_{14}$, refer to descriptions of a corresponding part in the control timing diagram shown in FIG. 10. Details are not described herein again.

In this embodiment of this application, the image sensor 11 is applicable to a global shutter mode, and can automatically determine, based on the intensity of the light received by the photodiode PD, a conversion gain mode corresponding to the intensity of the light, to ensure that the image sensor 11 needs to collect a reset voltage and a signal voltage only once and an ADC needs to operate only once, thereby reducing operation costs and power consumption of the image sensor 11, increasing a frame rate, and achieving high applicability.

It should be noted that at least two optical-to-electrical conversion units may share a same signal readout unit and a same conversion gain determining unit. When a quantity of optical-to-electrical conversion units is greater than or equal to 2, working principles of the image sensor 11 are the same. For ease of description, the following uses an example in which an image sensor 11 includes two optical-to-electrical conversion units for description.

Figure 12:
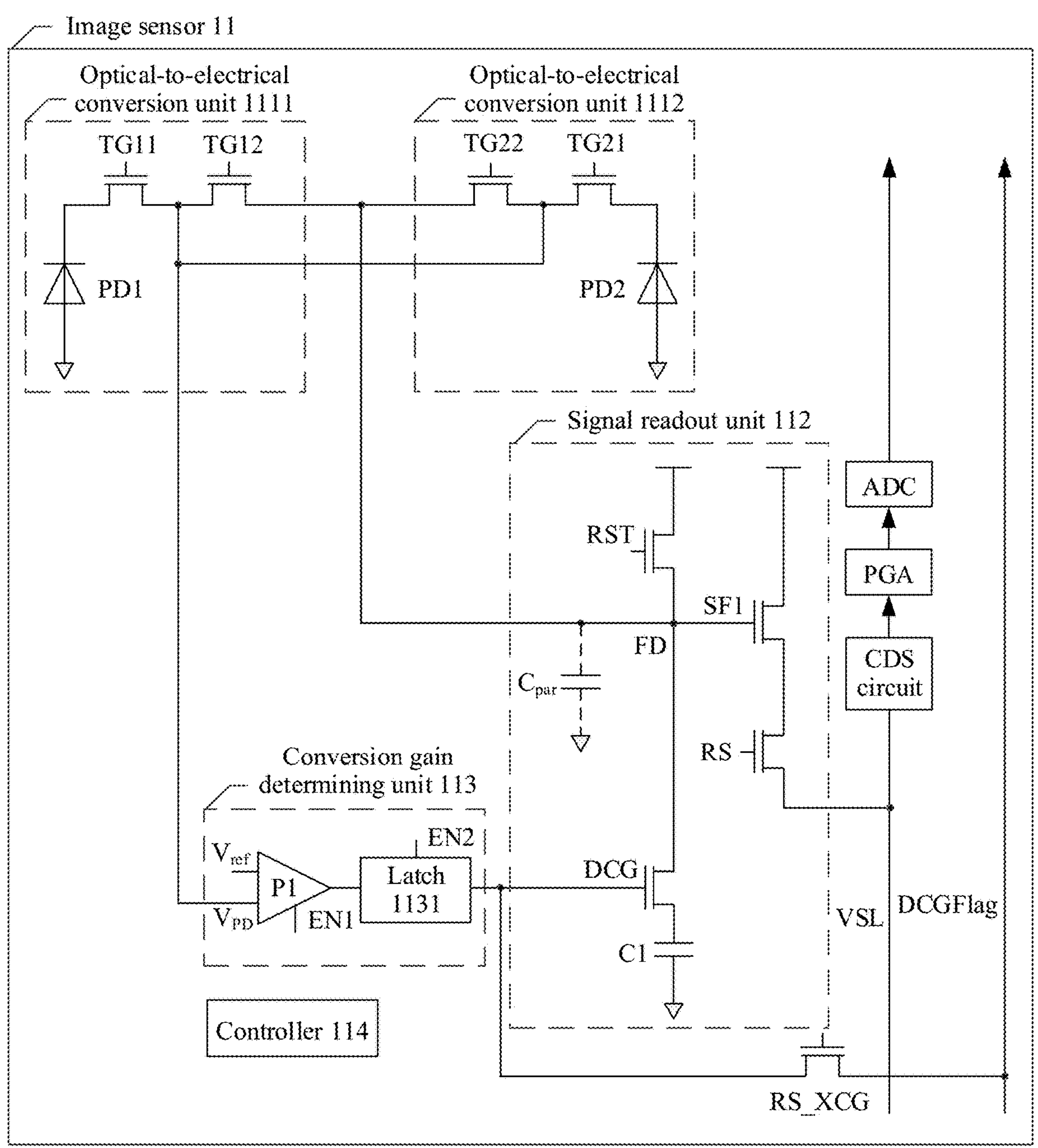
FIG. 12 is a diagram of still another structure of an image sensor according to this application.

FIG. 12 is a diagram of still another structure of an image sensor according to this application. As shown in FIG. 12, an image sensor 11 includes an optical-to-electrical conversion unit 1111, an optical-to-electrical conversion unit 1112, a signal readout unit 112, a conversion gain determining unit 113, and a controller 114. The optical-to-electrical conversion unit 1111 includes a photodiode PD1, a first charge transmission gate TG11, and a second charge transmission gate TG12. The optical-to-electrical conversion unit 1112 includes a photodiode PD2, a first charge transmission gate TG21, and a second charge transmission gate TG22. The signal readout unit 112 includes an FD node, a dual conversion gain transistor DCG, a first capacitor C1, a reset transistor RST, a first source follower SF1, and a row selector RS. The conversion gain determining unit 113 includes a comparator P1 and a latch 1131. The image sensor 11 further includes a first switch RS_XCG, a VSL, DCG-Flag, a CDS circuit, a PGA, and an ADC. The FD node is configured to store a charge corresponding to an electrical signal obtained by converting received incident light by the photodiode PD1 and a charge corresponding to an electrical signal obtained by converting received incident light by the photodiode PD2.

A cathode of the photodiode PD1 is connected to the FD node through the first charge transmission gate TG11 and the second charge transmission gate TG12 in sequence, and a cathode of the photodiode PD2 is connected to the FD node through the first charge transmission gate TG21 and the second charge transmission gate TG22 in sequence. In addition, a source of the second charge transmission gate TG12 is connected to a drain of the second charge transmission gate TG22, and a drain of the second charge transmission gate TG12 is connected to a source of the second charge transmission gate TG22 and then connected to an input end of the comparator P1. Herein, for a connection relationship between parts other than the optical-to-electrical conversion unit 1111 and the optical-to-electrical conversion unit 1112 in the image sensor 11, refer to descriptions of a corresponding part in the embodiment shown in FIG. 8. Details are not described herein again.

In an optional implementation, the image sensor 11 is used in a multi-pixel binning mode. After the image sensor 11 operates, the controller 114 controls the reset transistor RST, the first charge transmission gate TG11, the second charge transmission gate TG12, the first charge transmission gate TG21, and the second charge transmission gate TG22 to be turned on for eighth preset duration Δt6 and then turned off, to complete resetting of a voltage $V_{FD}$ of the FD node, a cathode voltage VPD1 of the photodiode PD1, and a cathode voltage $V_{PD2}$ of the photodiode PD2, thereby improving accuracy of a collected reset voltage and signal voltage. Then, the photodiode PD1 and the photodiode PD2 start to be exposed, and the photodiodes PD1 and PD2 convert received light into the cathode voltage VPD1 of the photodiode PD1 and the cathode voltage $V_{PD2}$ of the photodiode PD2 respectively. Then, after the photodiodes PD1 and PD2 are exposed for first preset duration Δt1, the controller 114 controls first charge transmission gates, namely, the first charge transmission gates TG11 and TG21 in the optical-to-electrical conversion unit 1111, and the optical-to-electrical conversion unit 1112 to be turned on. Because the second charge transmission gates TG12 and TG22 are turned off, the photodiodes PD1 and PD2 are connected in parallel, that is, the image sensor 11 operates in the binning mode. After the first charge transmission gates TG11 and TG21 are turned on for second preset duration Δt2, the controller 114 outputs a first control signal and a second control signal to an enable end EN1 of the comparator P1 and an enable end EN2 of the latch 1131 respectively, so that the comparator P1 and the latch 1131 start to operate based on the received first control signal and the received second control signal respectively. In other words, the comparator P1 compares a magnitude of a reference voltage $V_{ref}$ with a magnitude of a voltage $V_{PD}$ obtained by connecting the photodiode PD1 to the photodiode PD2 in parallel, and outputs a control voltage to the latch 1131 based on a comparison result. The latch 1131 outputs a control voltage to a gate of the dual conversion gain transistor DCG based on the control voltage output by the comparator P1, so that a gate voltage of the dual conversion gain transistor DCG is kept at the control voltage, the dual conversion gain transistor DCG is controlled to be stably in a turn-on state or a turn-off state when the enable end EN2 of the latch 1131 receives the second control signal, and the image sensor 11 is in an HCG mode or an LCG mode. Herein, after the image sensor 11 is in the HCG mode or the LCG mode, for a working principle of the image sensor 11, refer to descriptions of a corresponding part in the embodiment shown in FIG. 8. Details are not described herein again.

In another optional implementation, the image sensor 11 shown in FIG. 12 is also applicable to an image sensor in a single-PD mode (that is, there is only one optical-to-electrical conversion unit). For example, the controller 114 may control the first charge transmission gate TG21 and the second charge transmission gate TG22 to be always in the turn-off state, so that the optical-to-electrical conversion unit 1112 does not operate, and only the optical-to-electrical conversion unit 1111 operates. Correspondingly, for a working principle of the image sensor 11 in the single-pixel mode, refer to the descriptions in the embodiment shown in FIG. 8. Details are not described herein again.

In this embodiment of this application, the image sensor 11 automatically determines, based on intensity of light received by a photodiode PD, a conversion gain mode corresponding to the intensity of the light, to ensure that the image sensor 11 needs to collect a reset voltage and a signal voltage only once and the ADC needs to operate only once, thereby reducing operation costs and power consumption of the image sensor 11, and increasing a frame rate. In addition, the image sensor 11 is also applicable to the multi-pixel binning mode, supports application of an adaptive conversion gain determining mechanism (that is, a manner of automatically determining, based on intensity of incident light, a conversion gain mode corresponding to the intensity of the incident light) in a small-sized pixel, and has high applicability.

Figure 13:
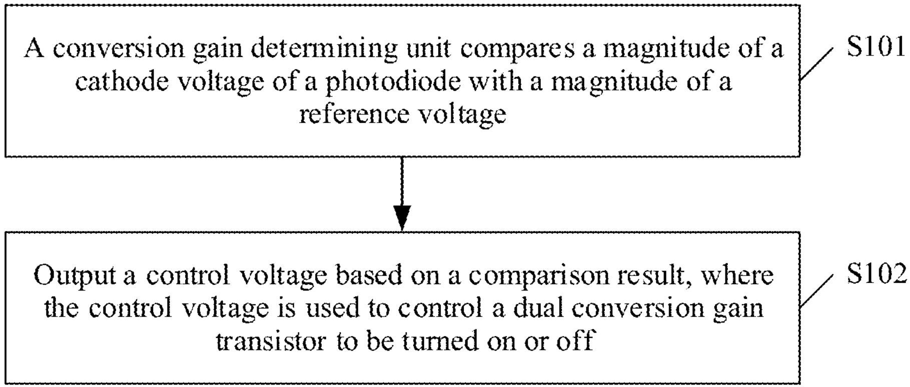
FIG. 13 is a schematic flowchart of an image sensor control method according to this application.

FIG. 13 is a schematic flowchart of an image sensor control method according to this application. The image sensor control method provided in this embodiment of this application is applicable to the conversion gain determining unit 113 and the controller 114 that are shown in FIG. 3 to FIG. 9 and FIG. 12. The image sensor control method may include the following steps.

S101: The conversion gain determining unit compares a magnitude of a cathode voltage of a photodiode with a magnitude of a reference voltage.

In an optional implementation, after the image sensor starts to operate, the photodiode starts to be exposed. Then, the conversion gain determining unit compares the magnitude of the cathode voltage of the photodiode with the magnitude of the reference voltage.

In another optional implementation, the conversion gain determining unit includes a comparator and a latch, an input end of the comparator is connected to a cathode of the photodiode, and an output end of the comparator is connected to a control end of the dual conversion gain transistor through the latch. The comparator is configured to compare the magnitude of the cathode voltage of the photodiode with the magnitude of the reference voltage, and outputs a control voltage to the latch based on a comparison result. The latch is configured to output the control voltage, so that an output voltage of the conversion gain determining unit is kept at the control voltage. The comparator further includes an enable end, the enable end is configured to receive a first control signal output by the controller, the first control signal is used to control an operating status of the comparator, the latch includes an enable end, the enable end is configured to receive a second control signal output by a controller, and the second control signal is used to control an operating status of the latch.

After an image sensor starts to operate, the controller controls a reset transistor and a second charge transmission gate to be turned on for eighth preset duration and then turned off, to complete resetting of a voltage of an FD node and the cathode voltage of the photodiode, thereby improving accuracy of a collected reset voltage and signal voltage. Then, the photodiode starts to be exposed, and the photodiode converts received light into the cathode voltage of the photodiode. Then, after the photodiode is exposed for first preset duration, the controller controls a first charge transmission gate to be turned on. After the first charge transmission gate is turned on for second preset duration, the controller outputs the first control signal and the second control signal to the enable end of the control comparator and the enable end of the latch respectively, so that the comparator and the latch start to operate based on the received first control signal and the received second control signal respectively. That is, the comparator compares the magnitude of the cathode voltage of the photodiode with the magnitude of the reference voltage.

S102: The conversion gain determining unit outputs the control voltage based on the comparison result, where the control voltage is used to control the dual conversion gain transistor to be turned on or off.

In an optional implementation, the conversion gain determining unit outputs the control voltage to a gate of the dual conversion gain transistor based on the result of comparison between the cathode voltage of the photodiode and the reference voltage, to control the dual conversion gain transistor to be in a turn-on state or a turn-off state, so that the image sensor is in an HCG mode or an LCG mode.

In another optional implementation, the comparator outputs the control voltage to the latch based on the result of comparison between the cathode voltage of the photodiode and the reference voltage. The latch outputs the control voltage to a gate of the dual conversion gain transistor based on the control voltage output by the comparator, so that a gate voltage of the dual conversion gain transistor is kept at the control voltage, the dual conversion gain transistor is controlled to be stably in a turn-on state or a turn-off state when the enable end of the latch receives the second control signal, and the image sensor is in an HCG mode or an LCG mode.

After the image sensor is in the HCG mode or the LCG mode, the controller sequentially obtains a reset voltage and a signal voltage.

In specific implementation, for more operations performed by the conversion gain determining unit and the controller in the image sensor control method provided in this application, refer to the implementations performed by the conversion gain determining unit 113 and the controller 114 that are shown in FIG. 3 to FIG. 9 and FIG. 12. Details are not described herein again.

In this embodiment of this application, the image sensor can automatically determine, based on intensity of the light received by the photodiode, a conversion gain mode corresponding to the intensity of the light, to ensure that the image sensor needs to collect a reset voltage and a signal voltage only once and an ADC needs to operate only once, thereby reducing operation costs and power consumption of the image sensor, increasing a frame rate, and achieving high applicability.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image sensor, comprising: an optical-to-electrical conversion circuit, a signal readout circuit, and a conversion gain determining circuit, wherein the optical-to-electrical conversion circuit comprises a photodiode, and the signal readout circuit comprises a floating diffusion node, a dual conversion gain transistor, and a first capacitor, wherein the floating diffusion node is configured to store a charge corresponding to an electrical signal obtained by converting incident light by the photodiode;

the dual conversion gain transistor is configured to connect the floating diffusion node to the first capacitor or disconnect the floating diffusion node from the first capacitor; and the conversion gain determining circuit is configured to compare a magnitude of a cathode voltage of the photodiode with a magnitude of a reference voltage, and output a control voltage based on a comparison result, wherein the control voltage is used to control the dual conversion gain transistor to be turned on or off.

2. The image sensor according to claim 1, wherein both a cathode of the photodiode and a first end of the dual conversion gain transistor are connected to the floating diffusion node, a second end of the dual conversion gain transistor is connected to one end of the first capacitor, and both an anode of the photodiode and the other end of the first capacitor are connected to a reference ground; and an input end and an output end of the conversion gain determining circuit are connected to the cathode of the photodiode and a control end of the dual conversion gain transistor respectively.

3. The image sensor according to claim 2, wherein the conversion gain determining circuit comprises a comparator and a latch, an input end of the comparator is connected to the cathode of the photodiode, an output end of the comparator is connected to the control end of the dual conversion gain transistor through the latch, and the comparator is configured to compare the magnitude of the cathode voltage of the photodiode with the magnitude of the reference voltage, and output the control voltage to the latch based on a comparison result; and the latch is configured to output the control voltage, so that an output voltage of the conversion gain determining circuit is kept at the control voltage.

4. The image sensor according to claim 3, further comprising: a first switch and a controller, wherein an output end of the latch is connected to a signal line through the first switch; and the controller is configured to: after the latch outputs the control voltage, control the first switch to be turned on; and after the image sensor outputs the control voltage through the signal line, control the first switch to be turned off, wherein the control voltage represents a capacitance at the floating diffusion node.

5. The image sensor according to claim 4, wherein the optical-to-electrical conversion circuit further comprises a first charge transmission gate, and the cathode of the photodiode is connected to the input end of the comparator through the first charge transmission gate;

the controller is further configured to: after the photodiode is exposed for first preset duration, control the first charge transmission gate to be turned on; and after a signal voltage is obtained, control the first charge transmission gate to be turned off;

the comparator further comprises an enable end, the enable end is configured to receive a first control signal output by the controller, the first control signal is used to control an operating status of the comparator, the latch comprises an enable end, the enable end is configured to receive a second control signal output by the controller, and the second control signal is used to control an operating status of the latch; and the controller is further configured to: after the first charge transmission gate is turned on for second preset duration, output the first control signal and the second control signal to the enable end of the comparator and the enable end of the latch respectively, so that both the comparator and the latch start to operate; after the comparator operates for third preset duration, stop outputting the first control signal to the enable end of the comparator, so that the comparator stops operating; and after the signal voltage is obtained, stop outputting the second control signal to the enable end of the latch, so that the latch stops operating.

6. The image sensor according to claim 5, wherein the optical-to-electrical conversion circuit further comprises a second charge transmission gate, and the cathode of the photodiode is connected to the floating diffusion node through the second charge transmission gate; and the controller is further configured to: after the comparator stops operating, control the second charge transmission gate to be turned on for fourth preset duration and then turned off;

and after the second charge transmission gate is turned off, obtain a voltage of the floating diffusion node to obtain the signal voltage.

7. The image sensor according to claim 6, wherein the cathode of the photodiode and a first end of the second charge transmission gate are connected to the input end of the comparator through the first charge transmission gate; or the cathode of the photodiode is connected to a first end of the second charge transmission gate and the input end of the comparator through the first charge transmission gate.

8. The image sensor according to claim 7, wherein the signal readout circuit further comprises a reset transistor, and a first end and a second end of the reset transistor are connected to a power supply and the floating diffusion node respectively; and the controller is further configured to: after the comparator stops operating, control the reset transistor to be turned on for fifth preset duration and then turned off; after the reset transistor is turned off, obtain the voltage of the floating diffusion node to obtain a reset voltage; and after the reset voltage is obtained, control the second charge transmission gate to be turned on.

9. The image sensor according to claim 8, wherein the signal readout circuit further comprises a first source follower and a row selector, and the image sensor further comprises a correlated double sampling circuit, wherein a first end, a second end, and a control end of the first source follower are connected to the power supply, a first end of the row selector, and the floating diffusion node respectively, and wherein a second end of the row selector is connected to the correlated double sampling circuit;

wherein the controller is configured to:

after the reset transistor is turned off, control the row selector to be turned on, and control the correlated double sampling circuit to obtain a voltage at the second end of the row selector to obtain the reset voltage;

after the second charge transmission gate is turned off, control the correlated double sampling circuit to obtain the voltage at the second end of the row selector to obtain the signal voltage; and after the signal voltage is obtained, control the row selector to be turned off.

10. The image sensor according to claim 6, wherein the signal readout circuit further comprises a reset transistor, and wherein a first end and a second end of the reset transistor are connected to a power supply and the floating diffusion node respectively;

wherein the controller is further configured to:

after the comparator stops operating, control the reset transistor to be turned on for fifth preset duration and then turned off; and after the reset transistor is turned off, control the second charge transmission gate to be turned on; and after the second charge transmission gate is turned off and before the signal voltage is obtained, obtain the voltage of the floating diffusion node to obtain a reset voltage.

11. The image sensor according to claim 10, wherein the signal readout circuit further comprises a first source follower, a second switch, a third switch, a fourth switch, a second capacitor, a third capacitor, a second source follower, and a row selector, wherein the image sensor further comprises a correlated double sampling circuit, a first end, a second end, and a control end of the first source follower are connected to the power supply, a first end of the second switch, and the floating diffusion node respectively, a second end of the second switch is connected to a control end of the second source follower, wherein a first end and a second end of the second source follower are connected to the power supply and a first end of the row selector respectively, a second end of the row selector is connected to the correlated double sampling circuit, the third switch is connected in series to the second capacitor and then connected between the second end of the second switch and the reference ground, and the fourth switch is connected in series to the third capacitor and then connected between the second end of the second switch and the reference ground;

wherein the controller is further configured to: after the comparator stops operating, control the second switch and the third switch to be turned on; and after the third switch is turned on for sixth preset duration, control the third switch to be turned off, wherein the sixth preset duration is greater than the fifth preset duration;

after the third switch is turned off, control the second charge transmission gate to be turned on;

after the third switch is turned off, control the fourth switch to be turned on; and after the fourth switch is turned on for seventh preset duration, control the fourth switch and the second switch to be turned off, wherein the seventh preset duration is greater than the fourth preset duration;

after the fourth switch is turned off, control the row selector and the third switch to be turned on, and control the correlated double sampling circuit to obtain a voltage at the second end of the row selector to obtain the reset voltage; after the reset voltage is obtained, control the third switch to be turned off; and after the third switch is turned off, control the fourth switch to be turned on, and control the correlated double sampling circuit to obtain the voltage at the second end of the row selector to obtain the signal voltage; and after the signal voltage is obtained, control the row selector and the fourth switch to be turned off.

12. The image sensor according to claim 8, wherein the controller is further configured to: before the photodiode is exposed, control the reset transistor and the second charge transmission gate to be turned on for eighth preset duration and then turned off.

13. The image sensor according to claim 9, wherein the floating diffusion node is a connection point between a second end of the second charge transmission gate, the second end of the reset transistor, and the control end of the first source follower.

14. The image sensor according to claim 2, further comprising: at least two optical-to-electrical conversion circuits;

wherein the floating diffusion node is configured to store a charge corresponding to an electrical signal obtained through conversion of at least two photodiodes in the at least two optical-to-electrical conversion circuits; and wherein the input end of the conversion gain determining circuit is connected to cathodes of the at least two photodiodes, the output end of the conversion gain determining circuit is connected to the control end of the dual conversion gain transistor, and the conversion gain determining circuit is configured to compare the magnitude of the reference voltage with a magnitude of a voltage obtained by connecting the at least two photodiodes in parallel.

15. An image sensor control method, applied to an image sensor, wherein the image sensor comprises an optical-to-electrical conversion circuit, a signal readout circuit, and a conversion gain determining circuit, the optical-to-electrical conversion circuit comprises a photodiode, and the signal readout circuit comprises a floating diffusion node, a dual conversion gain transistor, and a first capacitor, wherein the floating diffusion node is configured to store a charge corresponding to an electrical signal obtained by converting incident light by the photodiode, and the dual conversion gain transistor is configured to connect the floating diffusion node to the first capacitor or disconnect the floating diffusion node from the first capacitor; and the method comprises:

comparing, by the conversion gain determining circuit, a magnitude of a cathode voltage of the photodiode with a magnitude of a reference voltage, and outputting a control voltage based on a comparison result, wherein the control voltage is used to control the dual conversion gain transistor to be turned on or off.

16. The method according to claim 15, wherein both a cathode of the photodiode and a first end of the dual conversion gain transistor are connected to the floating diffusion node, a second end of the dual conversion gain transistor is connected to one end of the first capacitor, both an anode of the photodiode and the other end of the first capacitor are connected to a reference ground, and an input end and an output end of the conversion gain determining circuit are connected to the cathode of the photodiode and a control end of the dual conversion gain transistor respectively.

17. The method according to claim 16, wherein the conversion gain determining circuit comprises a comparator and a latch, an input end of the comparator is connected to the cathode of the photodiode, and an output end of the comparator is connected to the control end of the dual conversion gain transistor through the latch; and wherein the comparing, by the conversion gain determining circuit, the magnitude of the cathode voltage of the photodiode with the magnitude of the reference voltage, and outputting the control voltage based on the comparison result comprises:

comparing, by the conversion gain determining circuit, the magnitude of the cathode voltage of the photodiode with the magnitude of the reference voltage via the comparator, and outputting the control voltage to the latch based on the comparison result; and outputting, by the conversion gain determining circuit, the control voltage via the latch, so that an output voltage of the conversion gain determining circuit is kept at the control voltage.

18. The method according to claim 17, wherein the image sensor further comprises a first switch and a controller, and an output end of the latch is connected to a signal line through the first switch; and the method further comprises:

after the latch outputs the control voltage, controlling, by the controller, the first switch to be turned on; and after the image sensor outputs the control voltage through the signal line, controlling, by the controller, the first switch to be turned off, wherein the control voltage represents a capacitance at the floating diffusion node.

19. The method according to claim 17, wherein the optical-to-electrical conversion circuit further comprises a first charge transmission gate, and the cathode of the photodiode is connected to the input end of the comparator through the first charge transmission gate;

the method further comprises:

after the photodiode is exposed for first preset duration, controlling, by the controller, the first charge transmission gate to be turned on; and after a signal voltage is obtained, controlling, by the controller, the first charge transmission gate to be turned off;

the comparator further comprises an enable end, the enable end is configured to receive a first control signal output by the controller, the first control signal is used to control an operating status of the comparator, the latch comprises an enable end, the enable end is configured to receive a second control signal output by the controller, and the second control signal is used to control an operating status of the latch; and the method further comprises:

after the first charge transmission gate is turned on for second preset duration, outputting, by the controller, the first control signal and the second control signal to the enable end of the comparator and the enable end of the latch respectively, so that both the comparator and the latch start to operate;

after the comparator operates for third preset duration, stopping, by the controller, outputting the first control signal to the enable end of the comparator, so that the comparator stops operating; and after the signal voltage is obtained, stopping, by the controller, outputting the second control signal to the enable end of the latch, so that the latch stops operating.

20. The method according to claim 19, wherein the optical-to-electrical conversion circuit further comprises a second charge transmission gate, and the cathode of the photodiode is connected to the floating diffusion node through the second charge transmission gate; and the method further comprises:

after the comparator stops operating, controlling, by the controller, the second charge transmission gate to be turned on for fourth preset duration and then turned off; and after the second charge transmission gate is turned off, obtaining, by the controller, a voltage of the floating diffusion node to obtain the signal voltage.

* * * * *